(12) United States Patent
Hayashi et al.

(10) Patent No.: US 9,143,821 B2
(45) Date of Patent: Sep. 22, 2015

(54) INFORMATION PROCESSING APPARATUS AND PROGRAM TABLE DISPLAYING METHOD

(71) Applicant: SONY COMPUTER ENTERTAINMENT INC., Tokyo (JP)

(72) Inventors: Masakazu Hayashi, Tokyo (JP); Kensaku Ishizuka, Tokyo (JP); Yuki Kobayashi, Kanagawa (JP); Manabu Nishizawa, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/385,785

(22) PCT Filed: Apr. 1, 2013

(86) PCT No.: PCT/JP2013/002221
§ 371 (c)(1),
(2) Date: Sep. 17, 2014

(87) PCT Pub. No.: WO2013/153765
PCT Pub. Date: Oct. 17, 2013

(65) Prior Publication Data
US 2015/0074724 A1   Mar. 12, 2015

(30) Foreign Application Priority Data
Apr. 10, 2012   (JP) ................................. 2012-089745

(51) Int. Cl.
*H04N 5/445*   (2011.01)
*H04N 21/431*   (2011.01)
(Continued)

(52) U.S. Cl.
CPC ........ *H04N 21/4314* (2013.01); *G06F 3/04855* (2013.01); *H04N 21/4263* (2013.01);
(Continued)

(58) Field of Classification Search
CPC ............ H04N 21/482; H04N 21/4622; H04N 21/4821
See application file for complete search history.

(56) References Cited

U.S. PATENT DOCUMENTS 5,621,876 A * 4/1997 Odam et al. ................... 715/212
6,016,144 A * 1/2000 Blonstein et al. ............. 715/791
(Continued)

FOREIGN PATENT DOCUMENTS

JP   2002-359789 A   12/2002
JP   2004-187179 A    7/2004
(Continued)

OTHER PUBLICATIONS

International Search Report dated May 7, 2013, from the corresponding PCT/JP2013/002221.
(Continued)

*Primary Examiner* — Pankaj Kumar
*Assistant Examiner* — Timothy Newlin
(74) *Attorney, Agent, or Firm* — Katten Muchin Rosenman LLP

(57) ABSTRACT

A program information acquisition unit 60 acquires program information of each of a plurality of channels over a plurality of broadcasting types, among which a transmitting form of a broadcasting signal is different. A program table displaying unit 88 causes a program table, in which program information of the plurality of channels is juxtaposed in a classified state for each channel, to be displayed. The program table displaying unit 88 causes both of program information of channels belonging to a first broadcasting type and program information of channels belonging to a second broadcasting type to be displayed in a juxtaposed relationship in the same program table.

5 Claims, 21 Drawing Sheets

(51) Int. Cl.
*H04N 21/45* (2011.01)
*H04N 21/454* (2011.01)
*H04N 21/482* (2011.01)
*G06F 3/0485* (2013.01)
*H04N 21/426* (2011.01)
*H04N 21/472* (2011.01)
*H04N 21/485* (2011.01)

(52) U.S. Cl.
CPC ....... *H04N21/4532* (2013.01); *H04N 21/4542* (2013.01); *H04N 21/47205* (2013.01); *H04N 21/4821* (2013.01); *H04N 21/4858* (2013.01)

(56) References Cited

U.S. PATENT DOCUMENTS

| | | | |
|---|---|---|---|
| 6,147,714 A * | 11/2000 | Terasawa et al. | 348/564 |
| 6,163,345 A * | 12/2000 | Noguchi et al. | 348/564 |
| 6,239,794 B1 * | 5/2001 | Yuen et al. | 725/41 |
| 6,243,145 B1 | 6/2001 | Schlarb et al. | 725/39 |
| 6,323,911 B1 * | 11/2001 | Schein et al. | 348/552 |
| 6,421,067 B1 * | 7/2002 | Kamen et al. | 715/719 |
| 6,493,038 B1 * | 12/2002 | Singh et al. | 348/565 |
| 8,132,116 B1 * | 3/2012 | Schendel | 715/764 |
| 2002/0157100 A1 * | 10/2002 | Kitsukawa et al. | 725/56 |
| 2003/0090524 A1 * | 5/2003 | Segerberg et al. | 345/786 |
| 2003/0193519 A1 * | 10/2003 | Hayes et al. | 345/721 |
| 2004/0152055 A1 * | 8/2004 | Gliessner et al. | 434/169 |
| 2005/0044201 A1 * | 2/2005 | Suzuki et al. | 709/223 |
| 2007/0078881 A1 * | 4/2007 | Vignet | 707/102 |
| 2009/0116817 A1 * | 5/2009 | Kim et al. | 386/95 |
| 2010/0083313 A1 * | 4/2010 | White et al. | 725/39 |
| 2010/0175089 A1 * | 7/2010 | Seo et al. | 725/44 |
| 2011/0276868 A1 * | 11/2011 | Hoke et al. | 715/217 |
| 2014/0006951 A1 * | 1/2014 | Hunter | 715/719 |
| 2014/0189735 A1 * | 7/2014 | Cudak et al. | 725/38 |

FOREIGN PATENT DOCUMENTS

| | | |
|---|---|---|
| JP | 2004-363744 A | 12/2004 |
| JP | 2006-238049 A | 9/2006 |
| JP | 2008-60959 A | 3/2008 |

OTHER PUBLICATIONS

Notification of Reasons for Refusal dated Apr. 23, 2013, from the corresponding Japanese Application No. JP 2012-089745.

Translation of International Preliminary Report on Patentability dated May 7, 2013 from corresponding Application No. PCT/JP2013/002221.

\* cited by examiner

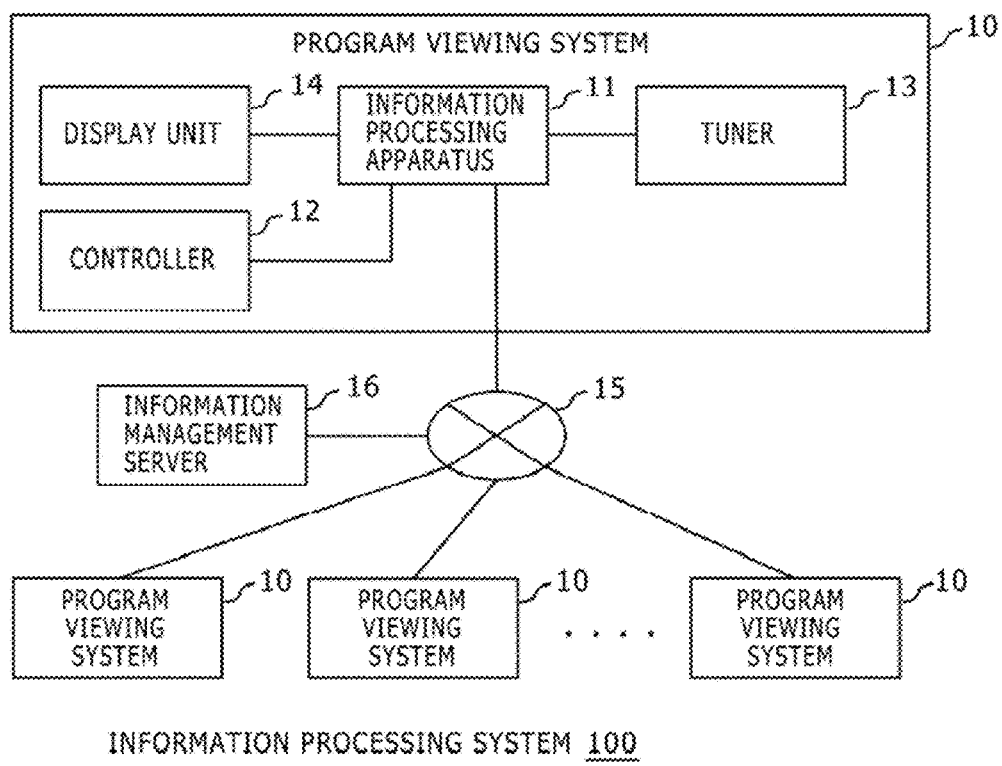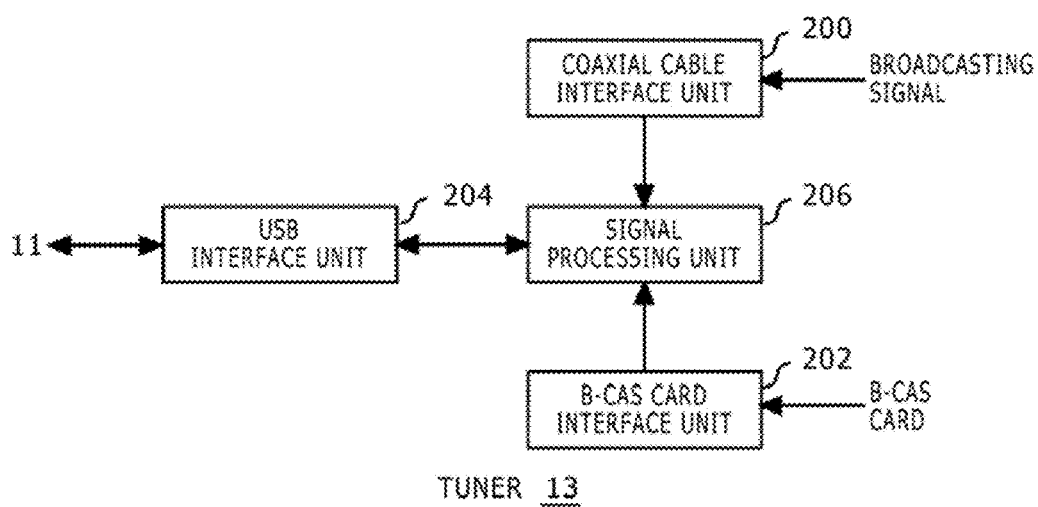

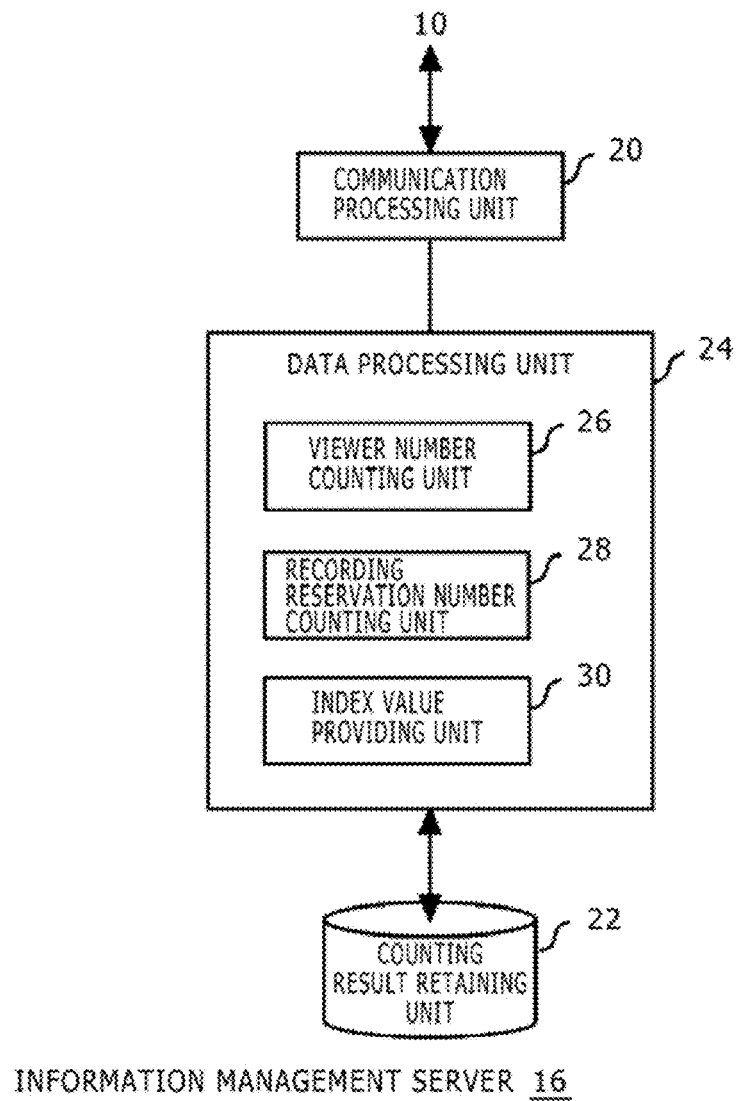

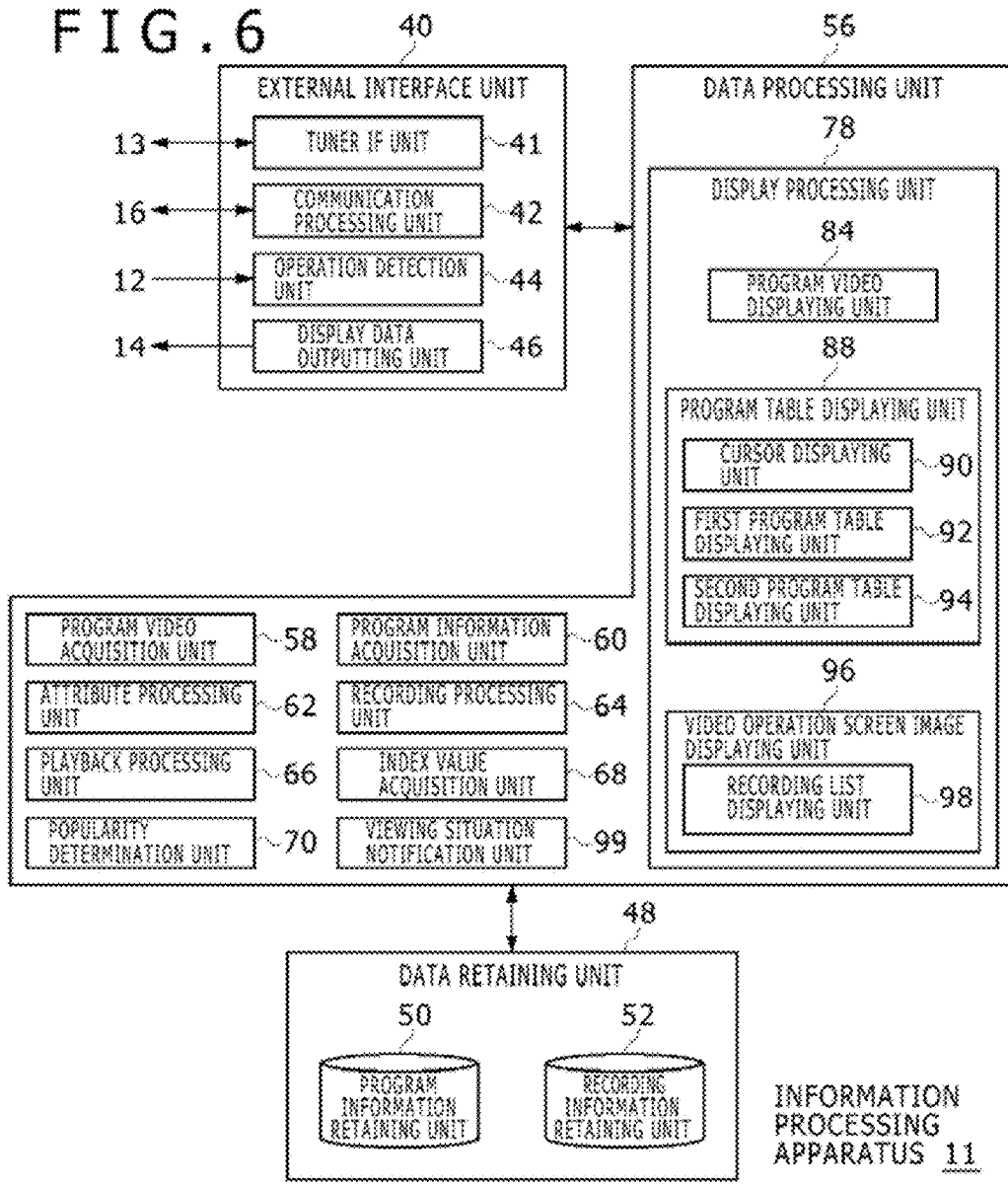

FIG. 21

| APPARATUS ID | RECEIVABLE CHANNEL | VIEWABLE CHANNEL (CONTRACTED CHANNEL) |
|---|---|---|
| LOCAL (DEDICATED TUNER 400) | TERRESTRIAL DIGITAL BROADCASTING: 1 ch··· | TERRESTRIAL DIGITAL BROADCASTING: 1 ch,2ch,4ch···(CHANNEL NUMBER: 7) |
| RECORDING APPARATUS 402a | TERRESTRIAL DIGITAL BROADCASTING: 1 ch··· BS BROADCASTING: 101ch··· CS BROADCASTING: 201ch··· | TERRESTRIAL DIGITAL BROADCASTING: 1 ch,2ch,4ch···(CHANNEL NUMBER: 7) BS BROADCASTING: 101ch,103ch,141ch···(CHANNEL NUMBER: 10) CS BROADCASTING: 321ch,322ch,323ch···(CHANNEL NUMBER: 40) |
| RECORDING APPARATUS 402b | TERRESTRIAL DIGITAL BROADCASTING: 1 ch··· CS BROADCASTING: 201ch··· | TERRESTRIAL DIGITAL BROADCASTING: 1 ch,2ch,4ch···(CHANNEL NUMBER: 7) CS BROADCASTING: 321ch,322ch,323ch···(CHANNEL NUMBER: 8) |

440

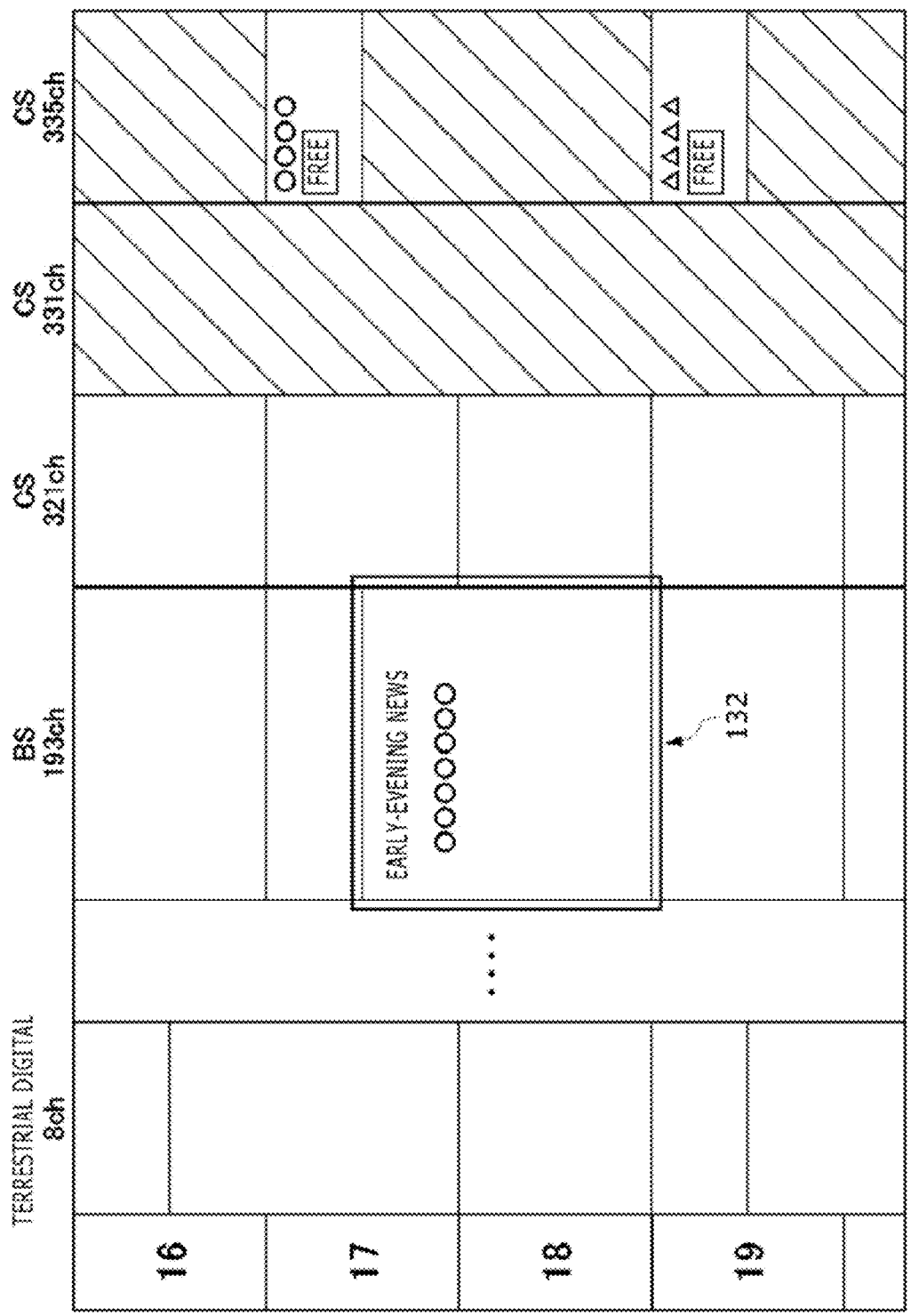

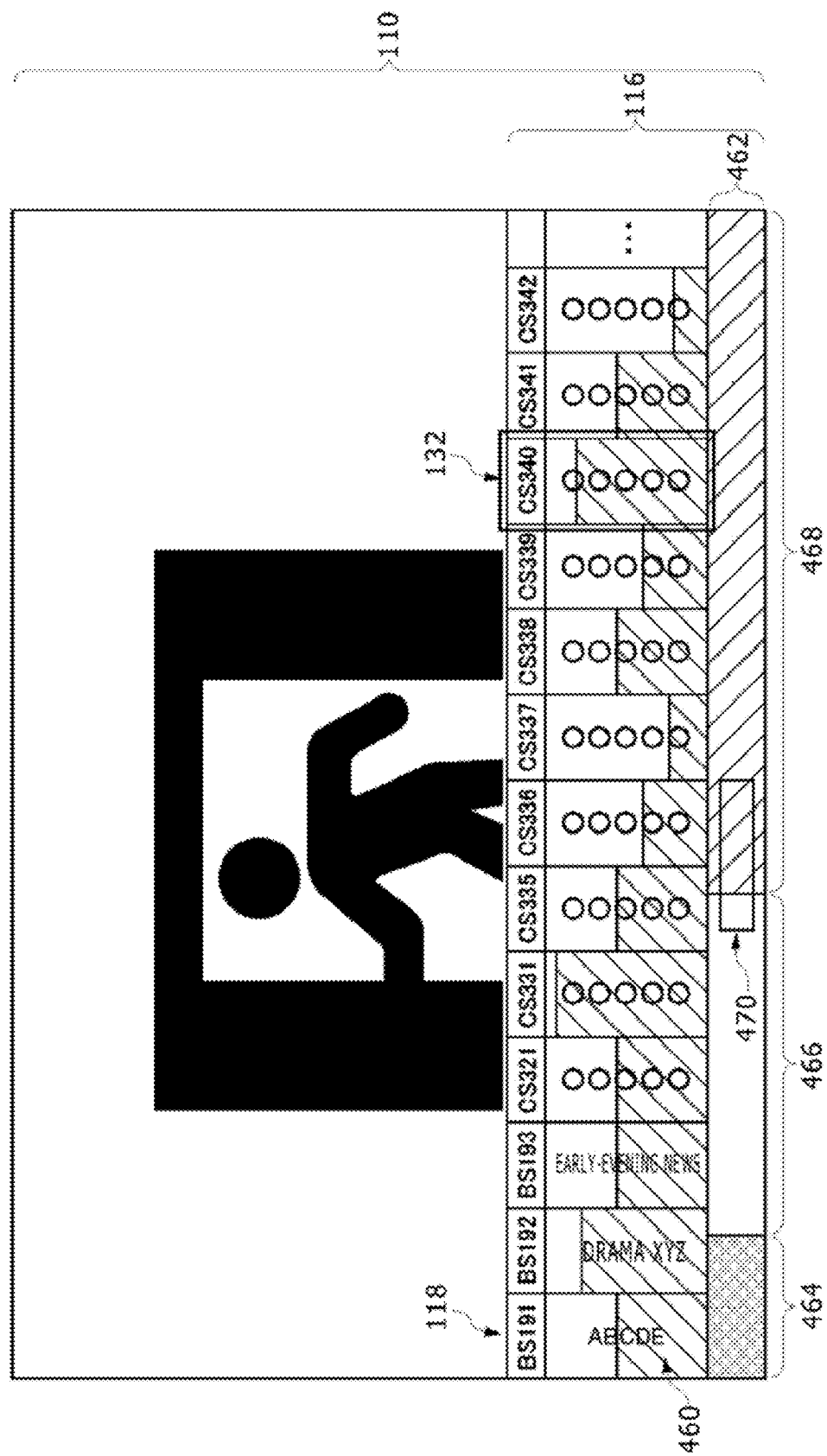

INFORMATION PROCESSING APPARATUS AND PROGRAM TABLE DISPLAYING METHOD

TECHNICAL FIELD

The present invention relates to a data processing technology, and particularly to an information processing apparatus and a program table displaying method.

BACKGROUND ART

In television broadcasting, multi-channeling over a plurality of broadcasting types such as terrestrial digital broadcasting, BS (Broadcasting Satellite) broadcasting, and CS (Communications Satellite) broadcasting has been implemented.

Further, in the television broadcasting, information representative of an outline or the like of programs provided by individual channels (such information is hereinafter referred to also as "program information") is transmitted by broadcasting signals. Thus, an electronic program table is sometimes displayed by a television set, a recording apparatus or the like. Generally, an electronic program table is displayed in a format in which information of a plurality of programs is disposed in a two-dimensional region having a time axis and a channel axis.

SUMMARY

Technical Problem

The inventor of the present invention considered that an electronic program table so far merely presented outline information of programs determined by broadcasting stations or the like and, as it were, a program table published in a newspaper or a magazine was merely displayed as electronic data. Further, the inventor considered that an idea which provides a suitable electronic program table conforming to a situation in which multi-channeling progresses and a particular method for the idea have not been proposed sufficiently.

Therefore, it is an object of the present invention to provide a suitable electronic program table conforming to a situation in which multi-channeling progresses.

Solution to Problem

In order to solve the problem described above, an information processing apparatus of a mode of the present invention includes a program information acquisition unit configured to acquire program information of each of a plurality of channels over a plurality of broadcasting types, among which a transmitting form of a broadcasting signal is different; and a program table displaying unit configured to cause a program table, in which program information of the plurality of channels is juxtaposed in a classified state for each channel, to be displayed and cause both of program information of channels belonging to a first broadcasting type and program information of channels belonging to a second broadcasting type to be displayed in a juxtaposed relationship in the same program table.

Another mode of the present invention is a program table displaying method. This method is a method executed by an information processing apparatus and includes a step of acquiring program information of each of a plurality of channels over a plurality of broadcasting types, among which a transmitting form of a broadcasting signal is different; and a step of causing a program table, in which program information of the plurality of channels is juxtaposed in a classified state for each channel, to be displayed and causing both of program information of channels belonging to a first broadcasting type and program information of channels belonging to a second broadcasting type to be displayed in a juxtaposed relationship in the same program table.

It is to be noted that also an arbitrary combination of the components described above and the representations of the present invention by conversion between or among an apparatus, a method, a system, a program, a recording medium in or on which the program is stored and so forth are effective as modes of the present invention.

Advantageous Effect of Invention

With the present invention, a suitable electronic program table conforming to a situation in which multi-channeling progresses can be provided.

BRIEF DESCRIPTION OF DRAWINGS

FIG. 1 is a view depicting a configuration of an information processing system of a form of a base technology.

FIG. 2 is a block diagram depicting a functional configuration of a tuner of FIG. 1.

FIG. 3 is a block diagram depicting a functional configuration of an information management server of FIG. 1.

FIG. 4 is a view illustrating a structure of data retained in a counting result retaining unit.

FIG. 6 is a block diagram depicting a functional configuration of the information processing apparatus of FIG. 1.

FIG. 7 is a view illustrating a structure of data retained in a program information retaining unit.

FIG. 8 is a view illustrating a structure of data retained in a recording information retaining unit.

FIG. 21 is a view illustrating apparatus information retained by an apparatus information retaining unit.

FIG. 22 is a view schematically depicting another second program table.

FIG. 23 is a view schematically depicting another first program table.

DESCRIPTION OF EMBODIMENTS

Base Technology

Figure 5:
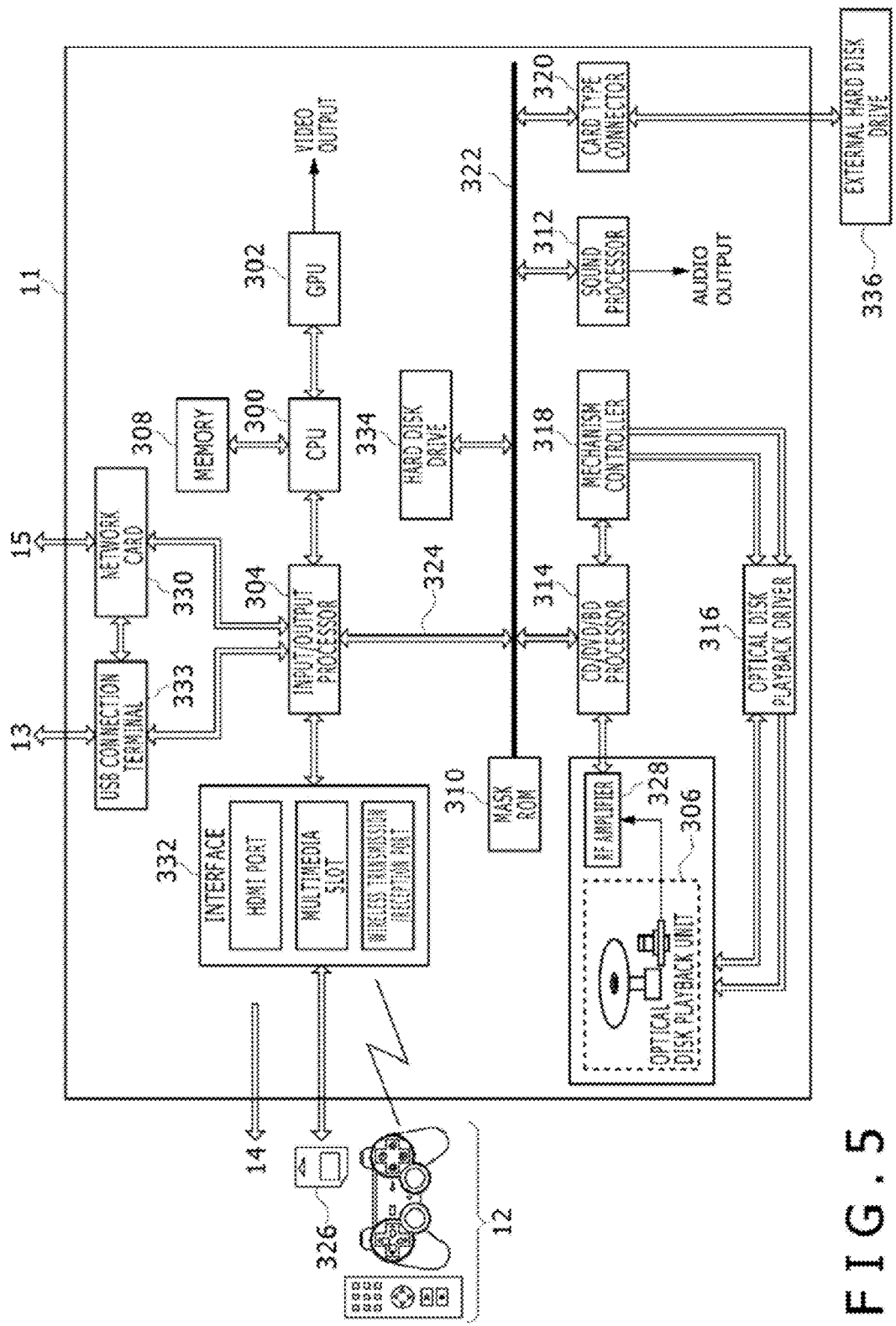
FIG. 5 is a view of a hardware configuration of an information processing apparatus of FIG. 1.

Before an embodiment of the present invention is described, a base technology therefor is described. In the present base technology, an information processing technology for improving an amenity and/or a convenience to a user who views a program being broadcasted or a broadcasted program is proposed. The present information processing technology includes the following two technology components.

An outline of the first technology component is described. An electronic program table in the past merely presents outline information of programs determined by broadcasting stations and so forth, and a usability of the electronic program table has not necessarily been good to viewers. The base technology proposes a technology for providing an electronic program table superior in usability to viewers. For example, an electronic program table of a form of the base technology provides a user interface which is improved in usability when a viewer confirms program information.

An outline of the second technology component is described. At present, residences having a connection environment to the Internet are increasing, and it has become possible to carry out data transfer between a home information appliance owned by a viewer of a program and a server on the Internet. In the base technology, a technology for providing an electronic program table which presents not only a mere program outline but also information useful to viewers based on data exchange through the Internet is proposed. For example, in an electronic program table of a form of the base technology, a popularity ranking of a plurality of programs to be broadcasted in the same time zone is presented.

FIG. 1 depicts a configuration of an information processing system of a form of the base technology. In an information processing system 100, a plurality of program viewing systems 10 and an information management server 16 are connected to each other through an Internet 15.

Each program viewing system 10 is a system which executes viewing, recording, and playback of a terrestrial digital television broadcast and displaying of a program table and includes an information processing apparatus 11, a controller 12, a tuner 13, and a display unit 14. In a form of the base technology, the program viewing system 10 makes a unit of a "viewer." Accordingly, a plurality of people who are viewing the display unit 14 are sometimes treated as a single viewer.

The tuner 13 is a terrestrial digital television tuner, and receives a broadcasting signal of a channel selected by the viewer and decodes the broadcasting signal into video information. Then, the tuner 13 sends the video information to the information processing apparatus 11. Meanwhile, the tuner 13 acquires EPG information, which is program information, from the broadcasting signal and sends the EPG information to the information processing apparatus 11. It is to be noted that the tuner 13 and the information processing apparatus 11 may be connected to each other by a USB (Universal Serial Bus) cable.

FIG. 2 is a block diagram depicting a functional configuration of the tuner 13 of FIG. 1. Blocks indicated in block diagrams of the present application can be implemented, in hardware, from elements beginning with a CPU and a memory of a computer and mechanical devices or the like and implemented, in software, from a computer program or the like. Here, however, functional blocks implemented by cooperation of them are depicted. Accordingly, it is recognized by those skilled in the art that the functional blocks can be implemented in various forms by a combination of hardware and software.

The tuner 13 includes a coaxial cable interface unit 200, a B-CAS card interface unit 202, a USB interface unit 204, and a signal processing unit 206 ("B-CAS" is a registered trademark). The coaxial cable interface unit 200 provides an interface function with a coaxial cable connected to an antenna and acquires a broadcasting signal of a terrestrial digital television broadcast. The B-CAS card interface unit 202 provides an interface function with a B-CAS card and acquires an encryption key for decoding a broadcasting signal from the B-CAS card.

The USB interface unit 204 provides an interface function with a USB cable and acquires identification information of a channel selected by the viewer from the information processing apparatus 11. Further, the USB interface unit 204 sends video information of a selected channel or EPG information to the information processing apparatus 11. The signal processing unit 206 extracts a signal of a channel selected by the viewer from a broadcasting signal and decodes the signal into video information in accordance with the encryption key of the B-CAS card.

Referring back to FIG. 1, the information processing apparatus 11 is a computer terminal connected to the Internet 15, and accepts an operation of the viewer through the controller 12 and behaves in accordance with the operation. The information processing apparatus 11 may be a stationary game machine. In the information processing apparatus 11, a program viewing application (hereinafter referred to as "program viewing AP") is installed which causes the information processing apparatus 11 to display a live video of a program in a terrestrial digital television broadcast, record the live video, and play back the recorded video. Also a web browser for causing the information processing apparatus 11 to interpret and display data of a structured document described in HTML, XML or the like is installed in the information processing apparatus 11.

If the program viewing AP is started up in the information processing apparatus 11, then, for example, the information processing apparatus 11 acquires video information of a channel selected by the viewer from the tuner 13 and causes the display unit 14 to display a program video. Further, the information processing apparatus 11 acquires EPG information from the tuner 13 and causes the display unit 14 to display an electronic program table. A detailed configuration of the information processing apparatus 11 is hereinafter described. It is to be noted that the information processing apparatus 11 and the display unit 14 may be connected to each other by an HDMI (registered trademark) (High-Definition Multimedia Interface) cable.

The information management server 16 manages viewing situations of programs acquired from the plural program viewing systems 10 and distributes the viewing situations to individual ones of the plural program viewing systems 10. A detailed configuration of the information management server 16 is hereinafter described.

FIG. 3 is a block diagram depicting a functional configuration of the information management server 16 of FIG. 1. It is recognized by those skilled in the art that, similarly as in FIG. 2, also functional blocks in FIG. 3 can be implemented in various forms by a combination of hardware and software. For example, the functional blocks of FIG. 3 may be stored as a computer program into a predetermined recording medium, installed into a hard disk of the information management server 16, suitably read out into a main memory of the information management server 16, and executed by a processor.

The information management server 16 includes a communication processing unit 20, a counting result retaining unit 22, and a data processing unit 24 which executes various data processes. The data processing unit 24 includes a viewer number counting unit 26, a recording reservation number counting unit 28, and an index value providing unit 30.

The communication processing unit 20 executes a communication process with an external apparatus through the Internet 15. The data processing unit 24 transmits and receives data to and from the information processing apparatus 11 of the program viewing system 10 through the communication processing unit 20. The counting result retaining unit 22 is a storage area for retaining result data of a counting process by the viewer number counting unit 26 and the recording reservation number counting unit 28 hereinafter described.

FIG. 4 illustrates a structure of data retained in the counting result retaining unit 22. In a program ID field, a program ID from which a program broadcasted in a specific date and time can be specified uniquely is set. In this program ID field, even if programs of the same title are broadcasted periodically, different program IDs are set depending upon the broadcasting date and time, and are determined in advance in EPG information. In a viewer number field, a total number of viewers who are viewing a program specified by the program ID is set. In a form of the base technology, programs are classified for each age group and for each sex, and the total number is set for each of the classes. In a recording reservation number field, total numbers for each age group and for each sex of viewers who have recording reservations of a program specified by the program ID are set.

Referring back to FIG. 3, the viewer number counting unit 26 periodically acquires a program ID of a program being viewed at present by a viewer from each of a plurality of information processing apparatus 11 and counts the program IDs. In one form of the base technology, the viewer number counting unit 26 acquires an attribute of a viewer (namely an age group and a sex) together with the program ID, counts the number of viewers of the program specified by the program ID for each of the attributes of the viewers and stores the counted viewer numbers into the counting result retaining unit 22.

The recording reservation number counting unit 28 periodically acquires a program ID of a program reserved for recording by a viewer from each of the plural information processing apparatus 11 and counts the number of the program IDs. In one form of the base technology, the recording reservation number counting unit 28 acquires an attribute of a viewer together with a program ID, counts the recording reservation number of the program specified by the program ID for each viewer attribute and stores the counted recording reservation numbers into the counting result retaining unit 22.

The index value providing unit 30 provides an index value indicative of a viewing situation of a program in the information processing system 100 to the information processing apparatus 11. This index value includes an index value (hereinafter referred to also as "live index value") indicative of whether the number viewers who are viewing the program is great or small and an index value (hereinafter referred to also as "reservation index value") indicative of whether the number of viewers who have a reservation for recording of the program is great or small.

In particular, the index value providing unit 30 transmits, as the live index value, the number of viewers for each age group and for each sex retained in the counting result retaining unit 22 to the information processing apparatus 11. Further, as the reservation index value, the index value providing unit 30 transmits the number of recording reservations for each age group and for each sex retained in the counting result retaining unit 22 to the information processing apparatus 11.

As a modification, the index value providing unit 30 may provide, in place of the viewer number itself, a result when a viewer number is inputted to a predetermined evaluation function as the live index value. For example, the viewer number of a certain program occupying in the overall viewer number, namely, a viewer rating, may be provided. This similarly applies also to the reservation index value. For example, the recording reservation number of a certain program occupying in the overall viewer number, namely, a recording reservation ratio, may be provided as the reservation index value.

FIG. 5 is a view of a hardware configuration of the information processing apparatus 11 of FIG. 1. The information processing apparatus 11 includes a CPU 300, a GPU (Graphic Processor Unit) 302, an input/output processor 304, an optical disk playback unit 306, a main memory 308, a mask ROM 310, and a sound processor 312 as basic components.

The CPU 300 controls signal processing and internal components based on various programs of a game, an electronic mail, an application for a Web browser and so forth. The CPU 300 may be a multicore CPU such as a CELL or may be a heterogeneous multicore CPU configured from a combination of a plurality of processor cores of different types.

The GPU 302 executes an image process. The input/output processor 304 executes an interface process between an outside and an inside of the apparatus and a process for keeping backward compatibility. The optical disk playback unit 306 plays back an optical disk such as a BD, a DVD, or a CD on which an application program or multimedia data is recorded. The main memory 308 functions as a work area of the CPU 300 or a buffer for temporarily storing data read out from an optical disk. The mask ROM 310 stores therein an operating system program which is executed principally by the CPU 300 or the input/output processor 304. The sound processor 312 processes an audio signal.

Further, the information processing apparatus 11 has also a CD/DVD/BD processor 314, an optical disk playback driver 316, a mechanism controller 318, a hard disk drive 334, and a card type connector (for example, a PC card slot) 320. The CD/DVD/BD processor 314 carries out, for example, an error correction process, a decompression decoding process and so forth for a disk playback signal read out from a CD/DVD/BD by the optical disk playback unit 306 and amplified by an RF amplifier 328 to reproduce (restore) the data recorded on the CD/DVD/BD. The optical disk playback driver 316 and the mechanism controller 318 execute rotation control of a spindle motor, focusing/tracking control of an optical pickup, loading control of a disk tray and so forth of the optical disk playback unit 306.

Further, the hard disk drive 334 stores save data of an application program or a game read out, for example, by the optical disk playback unit 306 or stores data of photographs, moving pictures, music and so forth acquired through the input/output processor 304. The card type connector 320 is a connection port, for example, for a communication card, an external hard disk drive 336 or the like. The components mentioned are connected to each other principally by bus lines 322, 324 and so forth.

The CPU 300 executes an operating system program for a CPU stored in the mask ROM 310 to control overall behavior of the information processing apparatus 11. Further, the CPU 300 loads data read out from an optical disk such as a CD, a DVD, or a BD into the main memory 308. Further, the CPU 300 executes various application programs and so forth downloaded through a communication network to control a behavior such as creation or editing of a game or an electronic mail or browsing of a Web page.

The input/output processor 304 executes an operating system program for an input/output processor stored in the mask ROM 310 to control setting of a signal or a game from the controller 12 in response to an operation of the user, inputting and outputting of data to or from a memory card 326 which stores the substance or an address of an electronic mail, a URL and so forth of a Web site.

Further, the input/output processor 304 controls also inputting and outputting of data through a USB connection terminal 333, a network card 330, an IEEE1394 terminal or a PC card slot not depicted and so forth. For example, the input/output processor 304 is connected to the tuner 13 through the USB connection terminal 333 and connected to the Internet 15 through the network card 330. Further, the input/output processor 304 carries out inputting and outputting of data to and from the memory card 326 through a PC card slot not depicted. Information from the controller 12 or the memory card is transferred through an interface 332 including a multimedia slot or a wireless transmission/reception port.

For example, the wireless transmission/reception port communicates with a game controller or a BD-DVD operating controller through a wireless LAN, the Bluetooth (registered trademark) or the like. Further, the interface 332 has an interface also with an HDMI (registered trademark) cable and outputs video data to the display unit 14 through the interface.

The GPU 302 has a function of a geometry transfer engine which carries out such a process as coordinate transformation and a function as a rendering processor, and renders an image in accordance with a rendering instruction from the CPU 300 and stores the rendered image into a frame buffer not depicted. Then, the GPU 302 outputs a video signal corresponding to the generated image. The sound processor 312 includes an ADPCM (Adaptive Differential Pulse Code Modulation) demodulation function, an audio signal reproduction function, a signal conversion function and so forth.

For example, if power supply is made available to the information processing apparatus 11 having such a configuration as described above, then operating system programs for the CPU 300 and the input/output processor 304 are read out from the mask ROM 310. The CPU 300 and the input/output processor 304 individually execute the corresponding operating system programs. Consequently, the CPU 300 comprehensively controls the components of the information processing apparatus 11. Meanwhile, the input/output processor 304 controls inputting and outputting of signals between the controller 12 and the memory card 326 and so forth.

Further, when the CPU 300 executes the operating system program, it first carries out an initialization process such as a behavior verification. Then, the CPU 300 controls the optical disk playback unit 306 to read out an application program for a game or the like recorded on an optical disk, loads the game application program into the main memory 308, and then executes the game application program. By the execution of the game application program, the CPU 300 controls the GPU 302 and the sound processor 312 in response to an instruction of the user accepted from the controller 12 through the input/output processor 304 to control display of an image and generation of effect sound or music sound.

FIG. 6 is a block diagram depicting a functional configuration of the information processing apparatus 11 of FIG. 1. It is recognized by those skilled in the art that also the functional blocks of FIG. 6 can be implemented in various forms from a combination of hardware and software similarly as in FIG. 2. For example, the functional blocks of FIG. 6 may be stored in a predetermined recording medium as a computer program and installed into the hard disk drive 334 of FIG. 5, read out suitably into the main memory 308 of the information processing apparatus 11, and executed by the CPU 300. In other words, also it can be said that the functional blocks of FIG. 6 indicate various modules which configure the program viewing AP.

The information processing apparatus 11 includes an external interface unit 40, a data retaining unit 48, and a data processing unit 56. The external interface unit 40 provides an interface function with various external apparatus, and the data processing unit 56 sends and receives data to and from an external apparatus through the external interface unit 40. The external interface unit 40 includes a tuner IF unit 41, a communication processing unit 42, an operation detection unit 44, and a display data outputting unit 46.

The tuner IF unit 41 provides an interface function with the tuner 13 and sends data accepted from the tuner 13 to the data processing unit 56. The communication processing unit 42 executes a communication process with the information management server 16 through the Internet 15. The operation detection unit 44 detects an operation of the viewer for the controller 12 and sends the substance of the operation to the data processing unit 56. The display data outputting unit 46 sends video or image data for display sent from a display processing unit 78 hereinafter described to the display unit 14 so as to be displayed on the display unit 14.

The data retaining unit 48 is a storage area for retaining various data and may be incorporated as a hard disk drive and storage data of the hard disk drive. The data retaining unit 48 includes a program information retaining unit 50 and a recording information retaining unit 52.

The program information retaining unit 50 retains program information of a plurality of programs to be displayed on an electronic program table. FIG. 7 illustrates a structure of data retained in the program information retaining unit 50. In a program outline field, outline information of the program is set. In a popularity ranking field, a relative popularity ranking of a plurality of programs broadcasted in the same time zone is temporarily set.

Referring back to FIG. 6, the recording information retaining unit 52 retains recording information relating to program recording by the information processing apparatus 11. FIG. 8 illustrates a structure of data retained in the recording information retaining unit 52. In a recording ID field, a recording ID with which a recording content can be specified uniquely by the information processing apparatus 11 is set.

In a recording flag field in FIG. 8, flags representative of whether or not a recording process has been executed already and whether or not an error has occurred in the recording process are set. For example, a record in which the recording flag field represents "executed" indicates a state after recording, but another record in which the recording flag field represents "not executed" indicates a recording reservation state. In a playback advance ratio field, a playback advancing situation of the recording content, namely, a value representative of by what percent the recording content has been recorded, is set. For example, a record whose playback advance ratio is "0%" indicates that playback of the recording content has not been executed at all. In a content data field, data of the recorded content itself, namely, data of recorded program videos and audios, subtitles and so forth can be set.

It is to be noted that a physical storage area in which the data retaining unit 48 retains various data may be the hard disk drive 334 built in the information processing apparatus 11, may be the external hard disk drive 336 or may be the memory card 326. Alternatively, only recording information (particularly data in the content data field) whose data size is generally great may be retained in the external hard disk drive 336. Data to be recorded and a storage area in which the data is to be recorded may be determined as needed by an operation of the viewer.

The data processing unit 56 is a functional block which executes various data processes and may be incorporated as a module of a computer program. The data processing unit 56 includes a program video acquisition unit 58, a program information acquisition unit 60, an attribute acquisition unit 62, a recording processing unit 64, a playback processing unit 66, an index value acquisition unit 68, a popularity determination unit 70, a display processing unit 78, and a viewing situation notification unit 99.

The program video acquisition unit 58 acquires video information of a program sent from the tuner 13. The program information acquisition unit 60 acquires EPG information sent from the tuner 13 and stores program information of programs into the program information retaining unit 50.

The attribute acquisition unit 62 acquires attribute information of the viewer itself inputted by the viewer, for example, an age and a sex of the viewer. For example, the attribute acquisition unit 62 may acquire such attribute information from a predetermined storage area in which attribute information inputted to a setting screen image of the information processing apparatus 11 by the viewer is retained.

The recording processing unit 64 executes a recording reservation process and a recording process of a program designated by the viewer and suitably updates recording information of the recording information retaining unit 52. For example, in the recording reservation process, the recording flag is set to "not executed." In the recording process, if it is detected that recording start time recorded in the recording information retaining unit 52 comes, then the recording processing unit 64 transmits a channel instruction designating a channel of a recording target program to the tuner 13. Then, the recording processing unit 64 accepts video and audio data of the recording target program transmitted from the tuner 13 through the program video acquisition unit 58 and successively records the video and audio data into the content data field. Further, if the recording process ends normally, then the recording processing unit 64 sets the recording flag to "executed" and sets, if an error occurs in the recording process, the recording flag to "error occurred."

The playback processing unit 66 sends video data of a recording content designated by the viewer to the display processing unit 78 to execute a playback process of the video data. Together with this, the playback processing unit 66 suitably updates the recording information of the recording information retaining unit 52 in response to a playback situation of the recording content. For example, the playback processing unit 66 sets a ratio of the playback time occupying in the recording time to the playback advance ratio field.

The index value acquisition unit 68 acquires a live index value and a reservation index value from the information management server 16. In particular, the index value acquisition unit 68 acquires a live index value and a reservation index value when a displaying process of an electronic program table is started by the display processing unit 78. Further, if the index value acquisition unit 68 detects lapse of an interval period determined in advance, then it newly acquires the latest live index value and reservation index value.

The popularity determination unit 70 determines a relative popularity ranking of a plurality of programs broadcasted in the same time zone in accordance with the live index value and/or the reservation index value. In one form of the base technology, as the total value of the live index value and the reservation index value becomes higher, a higher ranking is provided to the program. It is to be noted that, since the live index value is not obtained with regard to a program before it is broadcasted, the popularity ranking is determined only in accordance with the reservation index value. After a popularity ranking of the programs is determined, the popularity determination unit 70 updates the data of the popularity ranking field in the program information of the program information retaining unit 50.

If a population for which a popularity ranking is to be determined is designated in advance by the user, then the popularity determination unit 70 determines the popularity ranking in accordance with the live index value and reservation index value associated with a designated attribute or attributes (here, the age group and the sex). If no population is designated, then the popularity determination unit 70 determines the popularity ranking in accordance with the sum value of the live index values of all attributes and the sum value of the reservation index values of all attributes.

It is to be noted that the popularity determination unit 70 may output the index values themselves acquired by the index value acquisition unit 68 as data representative of the degrees of popularity without determining the popularity ranking. In this instance, the index values themselves are treated similarly to the popularity rankings.

The display processing unit 78 sends data of a moving picture or a still picture to be displayed on the display unit 14 to the display data outputting unit 46 so that an image desired by the viewer is displayed on the display unit 14. The display processing unit 78 includes a program video displaying unit 84, a program table displaying unit 88, and a video operation screen image displaying unit 96.

Referring back to FIG. 6, the program video displaying unit 84 causes the display unit 14 to display a video of a program. For example, when a user operation indicating displaying of a program video being broadcasted is accepted, the program video displaying unit 84 causes the display unit 14 to display a live video of a program acquired by the program video acquisition unit 58. Further, when a request for playback of a recording content is inputted on a video screen image, the program video displaying unit 84 causes the display unit 14 to display a video of the recording content accepted from the playback processing unit 66.

Further, the program video displaying unit 84 causes a television screen image or a video screen image (hereinafter referred to also as "video displaying screen image" collectively) in which a video of a program is displayed to display an operation icon for accepting an operation from the viewer.

Referring back to FIG. 6, the program table displaying unit 88 executes a displaying process of an electronic program table. The program table displaying unit 88 includes a cursor displaying unit 90, a first program table displaying unit 92, and a second program table displaying unit 94. The cursor displaying unit 90 causes the display unit 14 to display a cursor for allowing the viewer to select a particular program on an electronic program table and causes the cursor to move in response to an operation of the viewer. The viewer would operate the controller 12 to move the cursor to select a region (hereinafter referred to as "program frame") in which information of one program is displayed in the electronic program table. This program frame can be said also as a cell region formed from a time axis and a channel axis.

The first program table displaying unit 92 refers, when a predetermined operation is accepted during display of a program video by the program video displaying unit 84, to program information of the program information retaining unit 50 to cause a first program table to be displayed in an overlapping relationship with the program video. This first program table is a program table in which program information of a plurality of programs being broadcasted at present through a plurality of channels is disposed. The first program table displaying unit 92 sets a predetermined transmission factor so that the viewer can visually recognize a program video of a background and causes the first program table to be displayed.

In one form of the base technology, the first program table displaying unit 92 causes the first program table, in which information of programs being broadcasted at present is disposed, to be displayed. If a program displayed in a certain program frame ends, then the first program table displaying unit 92 causes information of a program, which is to be broadcasted next, to be displayed in the program frame.

Figure 9:
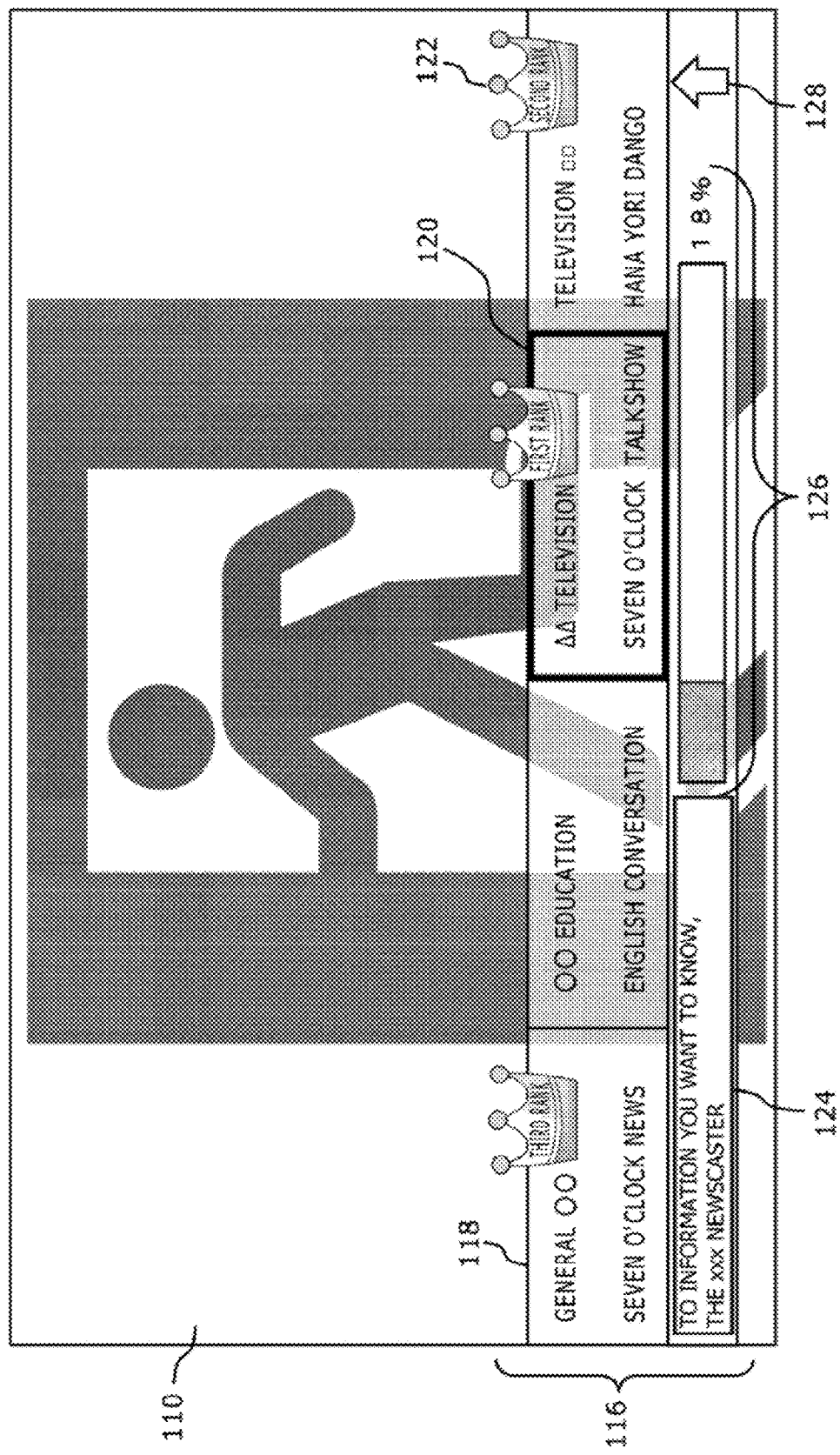
FIG. 9 is a view depicting a display image of a first program table.

FIG. 9 depicts a display image of a first program table 116. In the first program table 116, a program frame 118 corresponding to each of a plurality of channels is displayed, and a channel name and a program title are displayed in each program frame 118. The first program table displaying unit 92 refers to program information of the programs to cause objects representative of popularity rankings (each object is hereinafter referred to also as "popularity ranking indicator") to be displayed in an associated relationship with the program frames 118 of three programs having comparatively high popularity rankings. As a modification, the popularity ranking of each program may be suggested to the viewer by making the colors in the program frames 118 different from each other or by making the character fonts or the like of the program information different from each other. It is to be noted that the first program table displaying unit 92 periodically (for example, after every one minute) refers to the program information of the programs to update the display of the popularity ranking indicators.

The cursor displaying unit 90 causes a cursor 120 for selecting the program frame 118 to be displayed, and the viewer would select the program frame 118 of a program, whose substance, advance situation and so forth the viewer wants to confirm, by the cursor 120. The first program table displaying unit 92 acquires a program outline of the program corresponding to the program frame 118 selected by the cursor 120 (such a program is hereinafter referred to also as "provisionally selected program") from the program information retaining unit 50 and causes the program outline to be displayed through scrolling in a program outline field 124. It is to be noted that, when the cursor 120 is moved in a downward direction in a certain program frame 118, the first program table displaying unit 92 may cause information of a program, which is to be broadcasted next to the program being broadcasted at present, to be displayed in the program frame 118.

Further, the first program table displaying unit 92 calculates an advance degree of a provisionally selected program based on broadcasting start time and broadcasting end time of the provisionally selected program and the current time and causes the calculated advance degree to be displayed in an advance degree indicator 126. As a modification, the displaying modes of the plural program frames 118 displayed in the first program table 116 may be made different from each other in response to the advance degree of the program to suggest the advance degrees of the programs to the viewer.

Further, the first program table displaying unit 92 causes a popularity transition indicator 128 of the provisionally selected program to be displayed. When the first program table displaying unit 92 acquires the latest popularity ranking of the provisionally selected program, it sets the popularity transition indicator 128 so as to indicate a transition situation (for example, one of rising, falling, and no change) when compared with the popularity ranking till then.

If the viewer executes a predetermined viewing operation (to depress a particular button of the controller 12 or the like) for the provisionally selected program in the first program table 116, then the data processing unit 56 detects that the provisionally selected program is designated as finally selected program. At this time, the program video displaying unit 84 changes over the program video to be displayed in a video displaying screen image 110 to a video of the finally selected program. For example, the program video acquisition unit 58 acquires video information of the finally selected program from the tuner 13, and the program video displaying unit 84 causes the display unit 14 to display a program video of the finally selected program.

Figure 13:
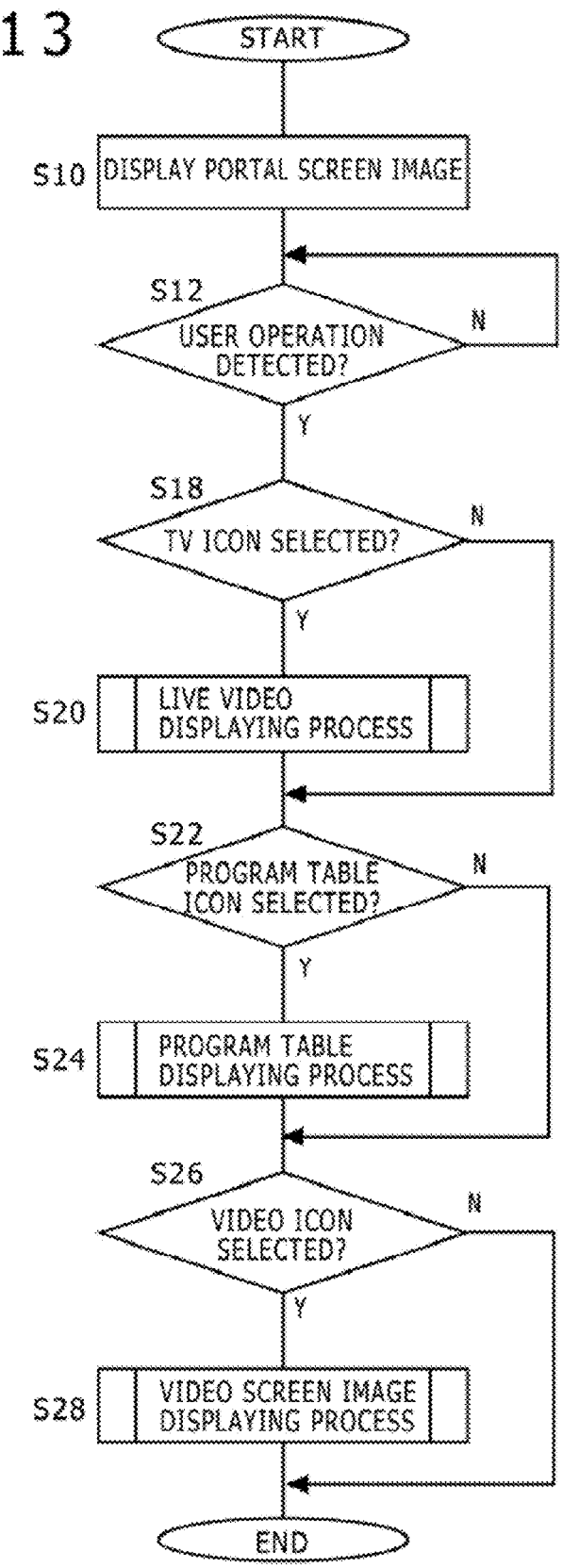
FIG. 13 is a flow chart illustrating a behavior of the information processing apparatus.

It is to be noted that, though not depicted in FIG. 13, the first program table displaying unit 92 may further cause a live index value and/or a reservation index value, on which the popularity ranking at present is based, to be displayed further in an associated relationship with a program whose popularity ranking indicator is displayed, the provisionally selected program or a like program. With the present mode, in addition to a popularity ranking by which a viewing situation of a program is abstracted, data itself indicative of an actual situation of the viewing situation can be confirmed by the viewer.

Referring back to FIG. 6, if a user operation which indicates displaying of a program table is detected, then the second program table displaying unit 94 causes a second program table to be displayed in an overall area of the screen image of the display unit 14. The second program table is an electronic program table in which an axis of ordinate represents the time axis over a plurality of time zones and an axis of abscissa represents the channel axis over a plurality of channels and in which program information of a plurality of programs is disposed.

Figure 10:
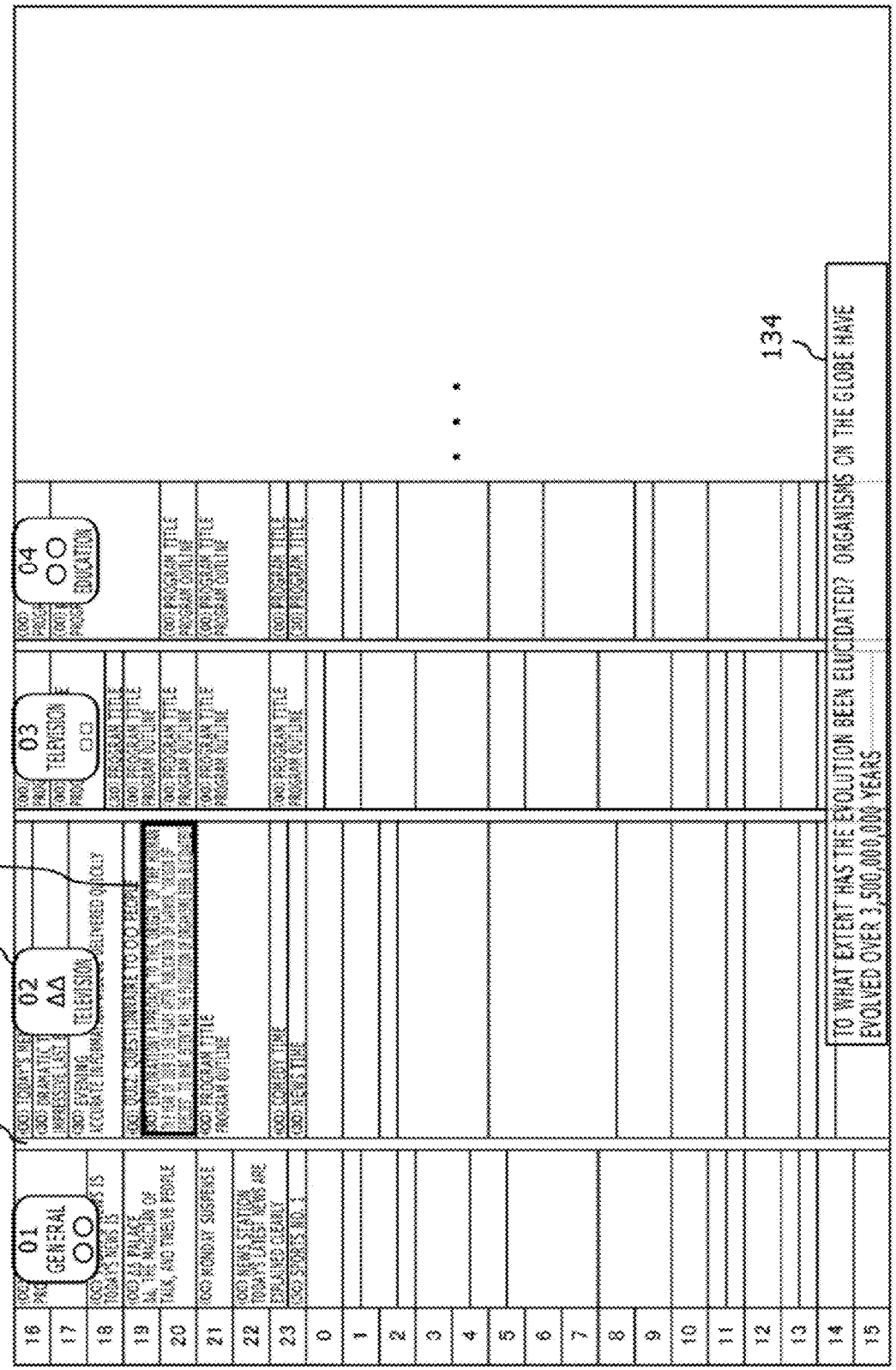
FIG. 10 is a view depicting a display image of a second program table.

FIG. 10 depicts a display image of the second program table. FIG. 10 depicts the second program table in which program information for 24 hours is displayed. A channel label 130 is a label object for identifying a channel of a terrestrial digital television broadcast. Between adjacent channels, a channel interval 131 is disposed. It is to be noted that, in order to allow the viewer to easily grasp programs to be broadcasted in the same time zone, the displaying mode of program frames may be made different among predetermined time zones (for example, for every three hours). For example, the color or the character font may be made different among the program frames.

The second program table displaying unit 94 expands or reduces a size of the region of a program frame in the second program table in response to an operation of the viewer. In particular, the second program table displaying unit 94 expands or reduces the size of a program frame per unit time and expands or reduces the size of a program frame per one channel. By this, a program information amount which can be displayed in each program frame increases or decreases. For example, the displaying mode of the second program table may be changed over to "axis of ordinate=24 hours, axis of abscissa=9 channels," "axis of ordinate=5 hours, axis of abscissa=7 channels," "axis of ordinate=3 hours, axis of abscissa=5 channels," or "axis of ordinate=2 hours, axis of abscissa=3 channels."

The second program table displaying unit 94 causes "program title (for starting of broadcasting)" to be displayed in a first row of a program frame of the second program table and causes a program outline to be displayed in the second and succeeding rows. In the second program table of "axis of ordinate=24 hours, axis of abscissa=9 channels," a program frame of a program of 30 minutes is displayed in a minimum display unit, namely, in one row. Therefore, for a program of shorter than 30 minutes, the program information is displayed in a balloon in response to movement of a cursor 132 hereinafter described.

The cursor displaying unit 90 causes the cursor 132 for selecting a program frame to be displayed, and the viewer would select a program frame of a program whose detailed information the viewer wants to know or a program which the viewer wants to determine as a target of a viewing operation using the cursor 132. Consequently, the program is designated as a provisionally selected program. The second program table displaying unit 94 causes the program frame of the provisionally selected program to be displayed in a size enlarged in the channel axis direction, namely, in a size greater than that of the other program frames. Further, the second program table displaying unit 94 causes a program outline of the provisionally selected program to be displayed through scrolling in a program outline field 134.

Figure 11:
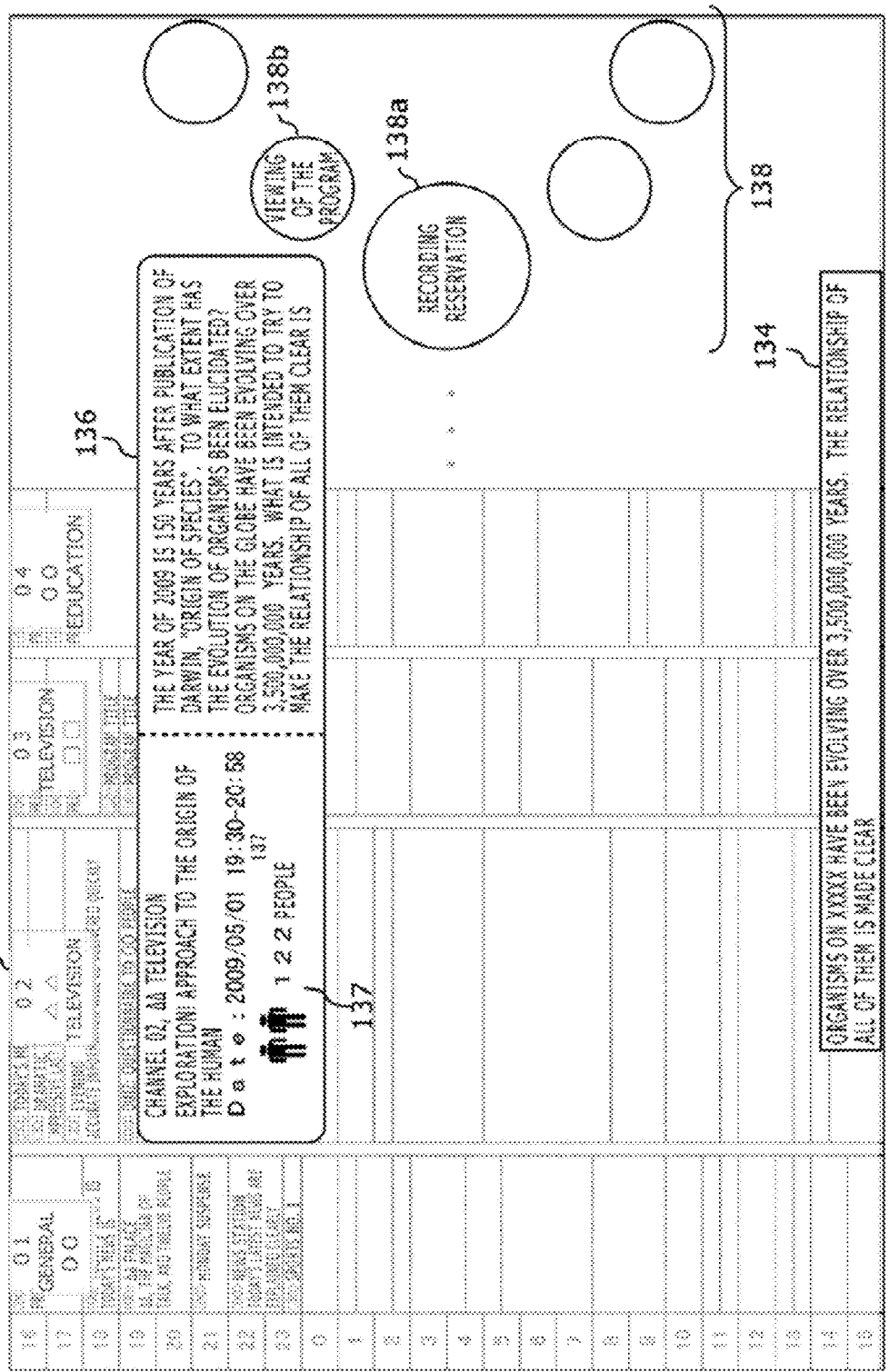
FIG. 11 is a view depicting the display image of the second program table.

Also FIG. 11 depicts a display image of the second program table. FIG. 11 illustrates a state in which the provisionally selected program in FIG. 10 is designated as a finally selected program by a predetermined operation of the user. The viewer would select an operation icon 138 such as a recording reservation icon 138*a* or a program viewing icon 138*b* to carry out a desired viewing operation for the finally selected program.

The second program table displaying unit 94 causes program information of the finally selected program (for example, a channel name, a broadcasting station name, a program title, broadcasting date and time, a viewing situation, or a program outline) to be displayed in a program details window 136. A viewing situation indicator 137 indicates the number of viewing persons of the finally selected program, and may particularly indicate a live index value, a reservation index value, or a total value of them. After the designation of the finally selected program is carried out, the second program table displaying unit 94 causes the program details window 136 to be displayed by popup display in an overlapping relationship with the second program table and causes the second program table, which is the background of the popup display, to be displayed with low picture quality than ever. For example, the second program table displaying unit 94 may exclude high frequency components from the image data of the second program table such that the second program table is displayed in somewhat gradating state.

Referring back to FIG. 6, if a user operation which indicates displaying of a video screen image for operating recording/playback of a program is accepted, then the video operation screen image displaying unit 96 causes the video screen image to be displayed on the display unit 14. The video operation screen image displaying unit 96 includes a recording list displaying unit 98. The recording list displaying unit 98 causes a recording list, which indicates information of recorded contents and table information of recording reservations, to be displayed on the video screen image.

Figure 12:
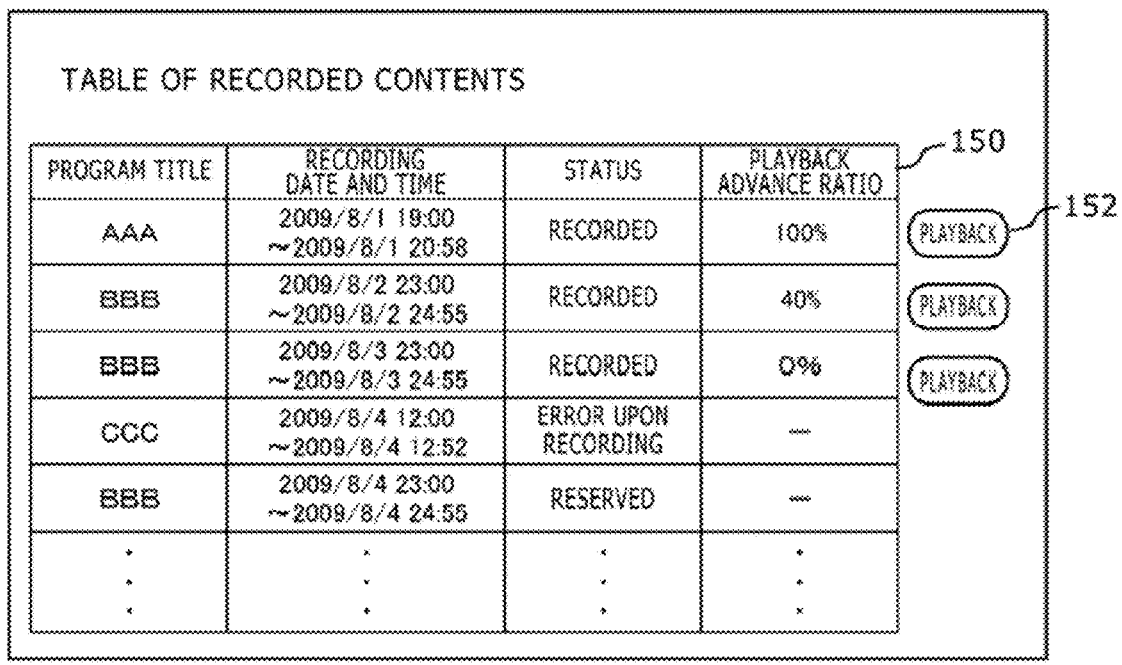
FIG. 12 is a view depicting an image of a video screen image on which a recording list is displayed.

FIG. 12 depicts an image of a video screen image on which a recording list is displayed. A recording list 150 displays a title, recording date and time, a status, and a playback advance ratio of recorded programs in a table. In a status field, information indicative of a status of a recorded content regarding whether or not the program is recorded already or reserved for recording already or an error has occurred. In a playback advance ratio field, a value representative of an advance degree of playback of the recorded content is set. The video operation screen image displaying unit 96 refers to the recorded information of the recording information retaining unit 52 to set a value for each field of the recording list. If a playback button 152 is selected by the viewer, then the playback processing unit 66 starts a playback process of the recorded content corresponding to the playback button 152.

Referring back to FIG. 6, the viewing situation notification unit 99 periodically transmits the program ID being displayed at present by the program video displaying unit 84, or in other words, viewing situation data which associates the program ID being viewed at present by the viewer and attribute information of the viewer with each other, to the information management server 16. Further, the viewing situation notification unit 99 periodically refers to the recorded information of the recording information retaining unit 52 and periodically transmits viewing situation data, which associates the program ID reserved for recording and the attribute information of the viewer with each other, to the information management server 16. A notification frequency of the viewing situation may be determined taking the real time property required for counting of the viewing situation and the network and system loads into consideration for comparison, and may be, for example, approximately one minute.

A behavior by the configuration described above is described below.

FIG. 13 is a flow chart illustrating a behavior of the information processing apparatus 11. FIG. 13 illustrates a behavior principally of the user interface. If a starting instruction of the program viewing AP is accepted by the information processing apparatus 11, then a portal screen image including a TV icon, a program table icon, a video icon and so forth is displayed (S10). Then, it is waited that an operation input of the viewer is detected (N at S12), and if an operation of the viewer is detected (Y at S12) and the operation is a selection operation of the TV icon (Y at S18), then a live video displaying process hereinafter described is executed (S20). If the operation is not a selection operation of the TV ion (N at S18), then the step S20 is skipped. When the operation is a selection operation of the program table icon (Y at S22), then a program table displaying process hereinafter described is executed (S24). If the operation is not a selection operation of the program table icon (N at S22), then the step S24 is skipped. If the operation is a selection operation of the video icon (Y at S26), then a video screen image displaying process hereinafter described is executed (S28). If the operation is not a selection operation of the video icon (N at S26), then the step S28 is skipped and the flow of FIG. 13 is ended.

Figure 14:
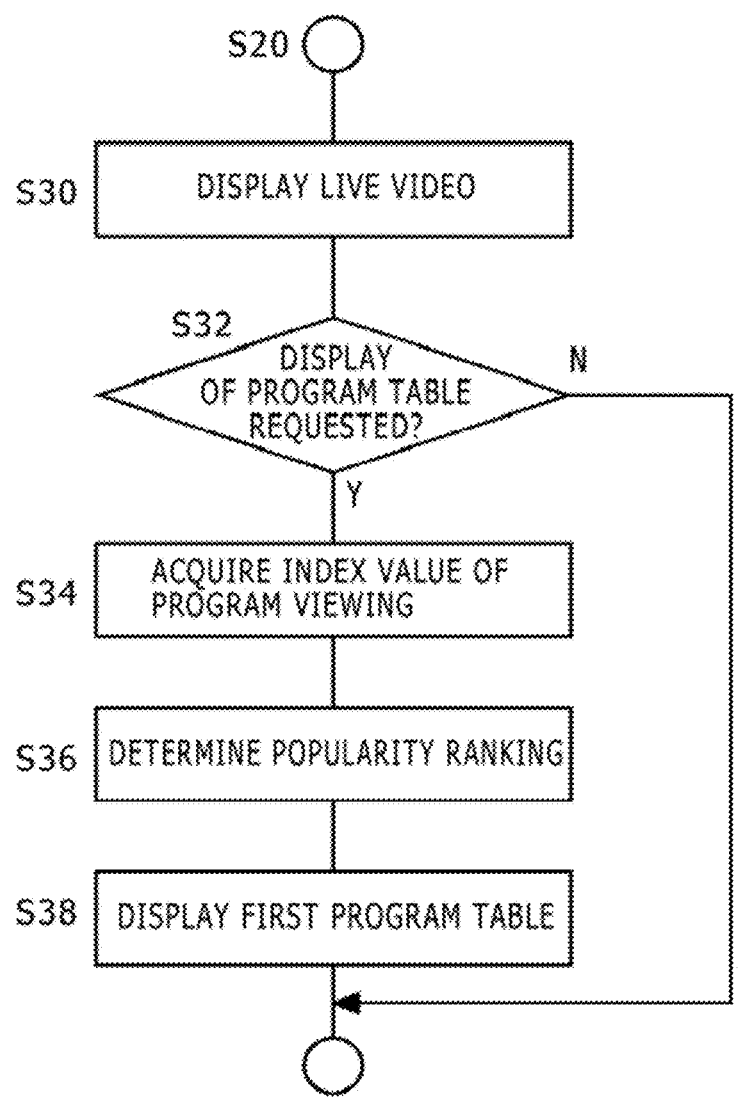
FIG. 14 is a flow chart illustrating S20 of FIG. 13 in detail.

FIG. 14 is a flow chart particularly illustrating the step S20 of FIG. 13. The program video acquisition unit 58 acquires video data of a program selected by the viewer from the tuner 13, and the program video displaying unit 84 causes a live video of the program to be displayed on the video displaying screen image 110 (S30). Here, if a displaying request for a program table is accepted (Y at S32), then the index value acquisition unit 68 acquires a live index value and a reservation index value from the information management server 16 (S34), and the popularity determination unit 70 determines a popularity ranking of the programs in accordance with the index values (S36). Then, the first program table displaying unit 92 causes a first program table, in which the program information and popularity rankings of the programs being broadcasted at present are displayed in an associated relationship with each other, to be displayed in an overlapping relationship with the video displaying screen image 110 (S38). If a displaying request for a program table is not accepted (N at S32), then the steps S34 to S38 are skipped.

Though not depicted in FIG. 14, if a ranking determination interval (for example, one minute) corresponding to a counting interval of the viewing situation by the information management server 16 elapses, then the index value acquisition unit 68 acquires the latest index values again from the information management server 16. The popularity determination unit 70 updates the popularity rankings of the programs in accordance with the latest index values. The first program table displaying unit 92 causes the popularity rankings of the programs after updated to be displayed in the first program table.

Since the first program table including the ranking indicators is displayed together with the live videos of the programs in this manner, the viewer can grasp a program having high popularity at the present point of time at a glance during viewing of a desired program. It is to be noted that, in the base technology, a viewing situation is specified based on an objective viewing behavior such as viewing of a program or a recording reservation. Consequently, a viewing situation can be specified with a higher degree of accuracy than that in an alternative case in which a viewing situation is based on a subjective index of a viewer to a program such as "favorable, unfavorable, or willing to view."

Further, since changeover of a channel can be carried out by an operation of the first program table, the viewer can select an interesting program at any time based on varying popularity rankings. Further, since an advance situation of each program or a transition situation of the popularity ranking of the programs is displayed in the first program table, the viewer can select a program to be viewed taking such situations into consideration. Further, since a program outline of a program selected by the cursor is displayed in the program outline field 124 by scrolling display, the region of the first program table can be suppressed while a desired program outline is confirmed by the viewer. Consequently, the visibility of a program video can be maintained readily.

Figure 15:
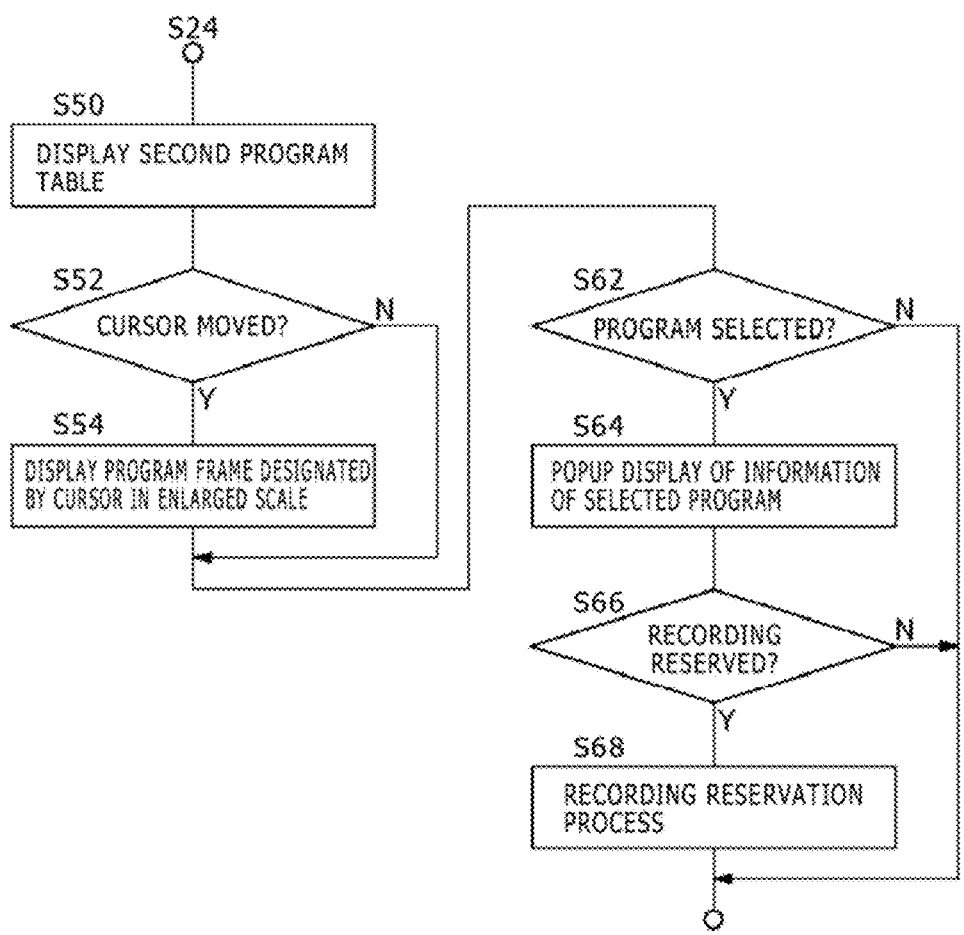
FIG. 15 is a flow chart illustrating S24 of FIG. 13 in detail.

FIG. 15 is a flow chart illustrating details of the step S24 of FIG. 13. The second program table displaying unit 94 causes the second program table to be displayed based on the program information of the program information retaining unit 50 (S50). The cursor displaying unit 90 moves the displaying position of the cursor between a plurality of program frames of the second program table in response to an operation of the viewer. When the cursor moves (Y at S52), the second program table displaying unit 94 causes the program frame designated by the cursor, in other words, the program frame of the provisionally selected program, to be displayed in a scale enlarged from that of the program frames of the other channels (S54). If there is no movement of the cursor (N at S52), then the step S54 is skipped.

Then, if a program of a viewing operation target is selected in the second program table, or in other words, if designation of a finally selected program is carried out (Y at S62), then the second program table displaying unit 94 causes the program information of the selected program to be displayed by popup display in the program details window 136 (S64). At this time, the operation icon 138 is displayed in conformity with the program details window 136. Further, the second program table which is the background is displayed in a gradating state. If a recording reservation is set for the finally selected program (Y at S66), then the recording processing unit 64 executes a predetermined recording reservation process and stores, for example, recording reservation information into the recording information retaining unit 52 (S68). If no recording reservation is set (N at S66), then the step S68 is skipped. If a finally selected program is not designated (N at S62), then the steps S64 to S68 are skipped.

With the present mode, a region of a program frame selected by the cursor in the second program table is enlarged dynamically, and a greater amount of program information than that before the selection is displayed. Consequently, the necessity for such an operation as an operation for causing a separate screen image to be displayed in order for the viewer to confirm program information decreases. In other words, the operation of the viewer for confirming program information is simplified and the convenience of the electronic program table is improved. Further, since the second program table and the program details window 136 are displayed in an overlapping relationship with each other, a viewing operation for a program can be carried out while the time spent for the viewing of the second program table or the program position in the second program table remains in the impression of the viewer. Further, by lowering the picture quality of the second program table which becomes the background of the program details window 136, the visibility of the program details window 136 can be improved relatively.

Figure 16:
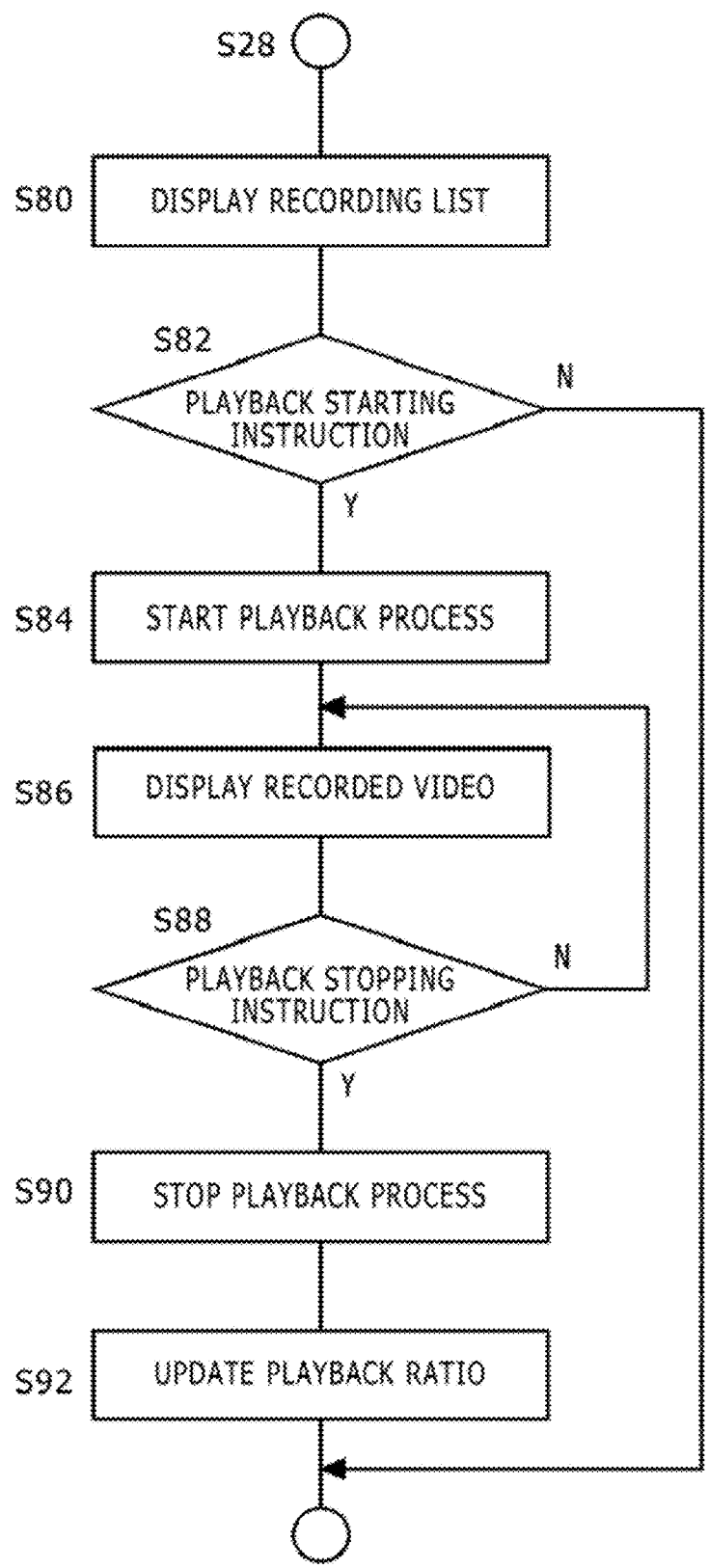
FIG. 16 is a flow chart illustrating S28 of FIG. 13 in detail.

FIG. 16 is a flow chart particularly illustrating the step S28 in FIG. 13. The video operation screen image displaying unit 96 causes a video screen image to be displayed, and the recording list displaying unit 98 causes the recording list 150 to be displayed in the video screen image (S80). In this recording list, a recorded content whose playback is interrupted midway is displayed in a mode in which this is suggested. In particular, a playback advance ratio representative of an advance degree of playback is displayed in an associated relationship with each recorded content. Consequently, the viewer can efficiently determine a recorded content to be played back.

If a playback starting instruction is accepted (Y at S82), then the playback processing unit 66 starts a playback process of the recorded content (S84) and successively sends data of the recorded video to the program video displaying unit 84. The program video displaying unit 84 causes the recorded video to be displayed on the display unit 14 (S86). If a playback stopping instruction is not accepted (N at S88), then the processing returns to step S86. If a playback stopping instruction is accepted (Y at S88), then the playback processing unit 66 stops the playback process of the recorded content (S90) and stores the playback advance rate at the point of time into the recording information retaining unit 52 (S92). If a playback starting instruction is not accepted (N at S82), then the steps S84 to S92 are skipped.

Figure 17:
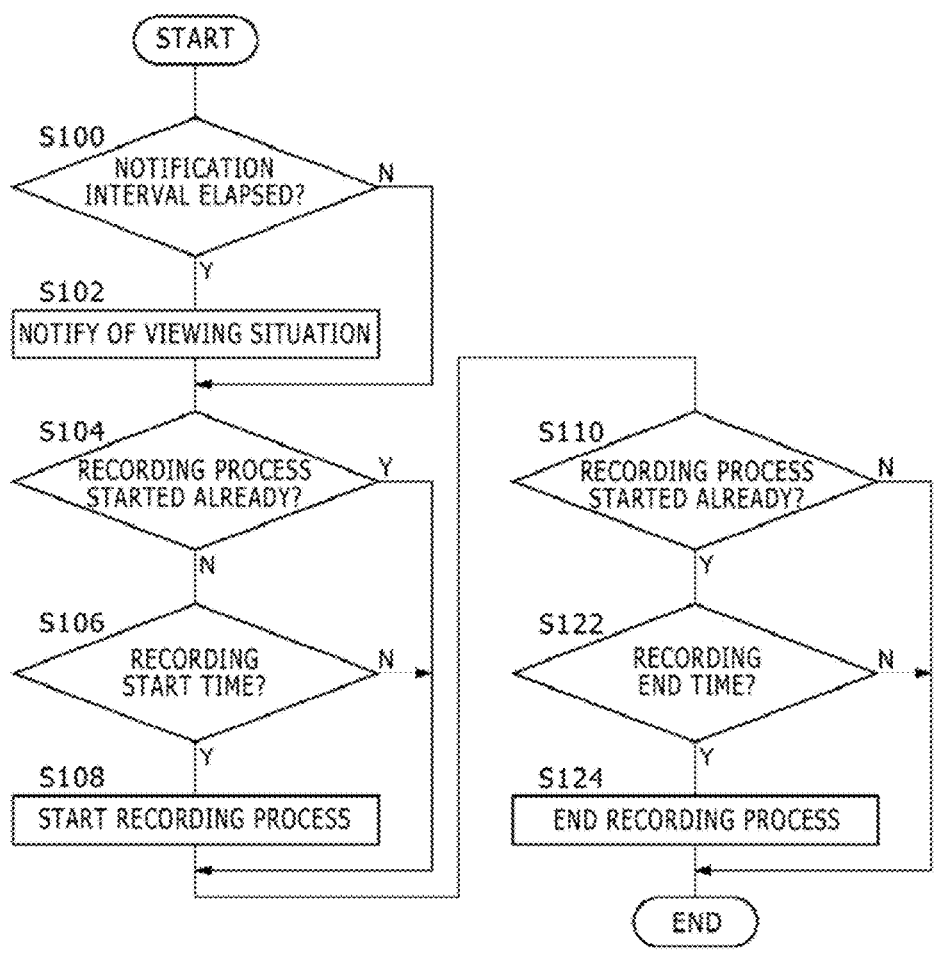
FIG. 17 is a flow chart illustrating a behavior of the information processing apparatus.

FIG. 17 is a flow chart illustrating a behavior of the information processing apparatus 11. FIG. 17 principally illustrates a behavior executed as a background process. If a notification interval (for example, one minute) determined in advance elapses (Y at S100), then the viewing situation notification unit 99 notifies the information management server 16 of a program ID with regard to which a live video is being displayed and a program ID or IDs reserved already for recording (S102). If the notification interval does not elapse (N at S100), then the step S102 is skipped. The recording processing unit 64 refers to the recorded information of the recording information retaining unit 52 to execute a reserved recording process. In particular, if a recording process is not started as yet (N at S104) and the recording start time comes (Y at S106), then the recording processing unit 64 starts a recording process (S108). If the recording start time does not come (N at S106), then the step S108 is skipped. If a recording process is started already (Y at S104), then the steps S106 and S108 are skipped. If a recording process is started already (Y at S110) and recording end time comes (Y at S122), then the recording processing unit 64 ends the recording process (S124). If a recording process is not started as yet (N at S110) or the recording end time does not come (N at S122), then the step S124 is skipped.

The form of the base technology has been described. The present form is illustrative, and it is recognized by those skilled in the art that various modifications are possible with regard to a combination of the components and the processing procedures described hereinabove and that also such modifications are included in the scope of the base technology.

Although, in the description of the form of the base technology above, it is described that the first program table is displayed in a displaying mode in which it reflects a popularity ranking of programs, the second program table is not described. In a modification, also the second program table may be displayed in a displaying mode in which a popularity ranking of programs is reflected. In this case, the second program table displaying unit 94 may vary the displaying mode (color, character font or the like) of program frames of the second program table in accordance with popularity rankings determined by the popularity determination unit 70. Further, just like the first program table, data of ranking indicators or index values themselves may be displayed in an associated relationship with program frames. According to this mode, useful information can be provided to the viewer who selects a program to be made a target of a viewing operation from within the second program table. For example, programs reserved for recording by many other viewers can be suggested to the viewer, and it is possible to support the viewer to determine a program to be reserved for recording.

Further, in the form of the base technology described hereinabove, a popularity ranking of each program is determined by the information processing apparatus 11. In a modification, popularity rankings of all attributes of viewers with regard to programs and popularity rankings for individual viewer attributes may be determined by the information management server 16. In this case, the index value acquisition unit 68 of the information processing apparatus 11 may acquire the popularity rankings as index values from the information management server 16, and the popularity determination unit 70 may send the acquired popularity rankings as they are to the data processing unit 56.

Embodiment

As described hereinabove, in television broadcasting, multi-channeling over a plurality of broadcasting types is being implemented. The plural broadcasting types are different in a transmitting form of a broadcasting signal from each other and include, for example, broadcasting in which a broadcasting signal is transmitted by terrestrial waves (terrestrial digital method), broadcasting in which a broadcasting signal is transmitted through a broadcasting satellite (BS broadcasting) and broadcasting in which a broadcasting signal is transmitted through a communication satellite (CS broadcasting). It is to be noted that the BS broadcasting and the CS broadcasting are different, for example, in transmission power, frequency band to be used and so forth.

An information processing apparatus 11 of the embodiment implements, in addition to the functions of the information processing apparatus 11 described in the description of the base technology, a function for providing an electronic program table conforming to a situation in which multi-channeling progresses. In particular, as a first function, program information of a plurality of channels over a plurality of broadcasting types is displayed in a juxtaposed relationship in the same program table. Consequently, a user who is a viewer can search out a desired program (namely, a channel) seamlessly in the same program table without being conscious of a broadcasting type of each channel.

Further, in a situation in which multi-channeling progresses, program information of a channel in which viewing of the user is limited (such a channel is hereinafter referred to also as "viewing-limited channel") and another channel in which viewing of the user is not limited (such a channel is hereinafter referred to also as "viewing-unlimited channel") is sometimes displayed together.

The viewing-limited channel can be regarded as a channel whose videos and audios cannot be viewed by the user. For example, the viewing-limited channel is a channel for which the user does not have a contract from among channels for viewing of which it is a condition for the user to make a viewing contract in advance and pay a viewing fee. Typically, the viewing-limited channel is a pay channel for which the user does not have a contract from among pay channels of BS broadcasting and CS broadcasting. Meanwhile, the viewing-unlimited channel can be regarded as a channel in which the user can view videos and audios. For example, the viewing-unlimited channel is a channel for which the user has a contract from among channels for viewing of which it is a condition for the user to make a contract in advance and pay a viewing fee. Typically, the viewing-unlimited channel is a pay channel for which the user has a contract from among pay channels of BS broadcasting and CS broadcasting. Also channels of free broadcasting, typically, channels of terrestrial digital broadcasting, are included in such viewing-unlimited channels.

The information processing apparatus 11 of the embodiment causes, as a second function, program information of a viewing-limited channel and program information of a viewing-unlimited channel to be displayed in different modes in a program table. Consequently, it is possible to easily discriminate, from among a number of channels disposed in a program table, viewing-limited channels and viewing-unlimited channels, and it is possible to support a channel selection operation of the user.

Figure 18:
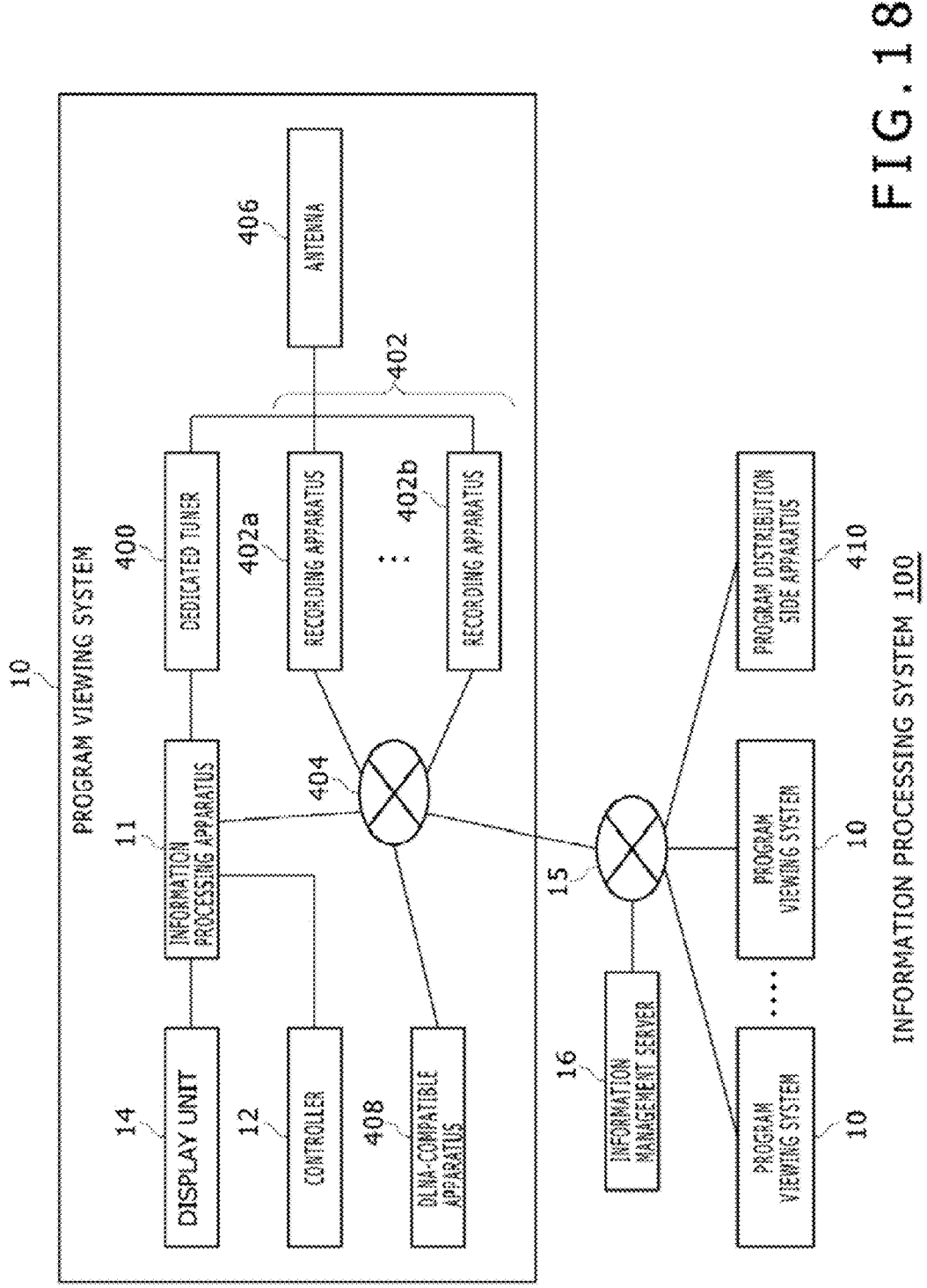
FIG. 18 is a view depicting an information processing system of an embodiment.

FIG. 18 depicts a configuration of the information processing system 100 of the embodiment. The information processing apparatus 11 in the information processing system 100 of the embodiment behaves as a DLNA client which communicates with an external apparatus in compliance with the DLNA (Digital Living Network Alliance) standard. A DLNA-compatible apparatus 408 is, for example, a digital television set or a BD recorder (Blu-ray disk recorder) and behaves as a DLNA client similarly to the information processing apparatus 11.

Typically, the program viewing system 10 is constructed in a home of a user (namely, a viewer), and a LAN 404 is a home network of the user including communication apparatus such as a layer 2 switch and is a communication network in compliance with the DLNA standard or a compatible standard with the DLNA standard. The information processing apparatus 11 and the DLNA-compatible apparatus 408 are connected to a recording apparatus 402a and another recording apparatus 402b generally referred to as recording apparatus 402 through the LAN 404.

Each recording apparatus 402 behaves as a DLNA server and provides, in addition to the program recording function, a function of a digital tuner. In particular, the recording apparatus 402 is also a general purpose tuner which provides a service as a digital tuner to various DLNA clients including the information processing apparatus 11 and the DLNA-compatible apparatus 408. On the other hand, a dedicated tuner 400 corresponds to the tuner 13 in the embodiment and is a digital tuner for exclusive use for the information processing apparatus 11. The dedicated tuner 400 is connected directly to the information processing apparatus 11 by a USB cable.

Each of the dedicated tuner 400, recording apparatus 402a, and recording apparatus 402b is a single tuner and receives broadcasting signals of terrestrial digital broadcasting, BS broadcasting, and CS broadcasting through an antenna 406. It is a matter of course that, as a modification, the dedicated tuner 400, recording apparatus 402a, and recording apparatus 402b may receive broadcasting signals through different antennae from each other. It is assumed that, in the present embodiment, the dedicated tuner 400 receives only signals of terrestrial digital broadcasting; the recording apparatus 402a receives signals of all of terrestrial digital broadcasting, BS broadcasting, and CS broadcasting; and the recording apparatus 402b receives signals of terrestrial digital broadcasting and CS broadcasting.

A program distribution side apparatus 410 is an information processing apparatus on the company side which distributes terrestrial digital broadcasting, BS broadcasting, and CS broadcasting. In the present embodiment, the program distribution side apparatus 410 stores unique contract numbers recorded in B-CAS (registered trademark) cards on the user side (such a contract number is hereinafter referred to also as "user contract number") and channels which can be viewed by users who possess the contract numbers in an associated relationship with each other. For example, the program distribution side apparatus 410 stores, with regard to pay channels which require a pre-contract for viewing with a user, user contract numbers and identification information of those channels contracted by the users in an associated relationship with each other. It can be said that a channel contracted by a user is a channel whose viewing by the user is permitted, and also it can be said that the channel is a channel whose decoding by a tuner on the user side is permitted. As hereinafter described, the program distribution side apparatus 410 accepts an inquiry from the recording apparatus 402 about channels which can be viewed by a user whose contract number is designated, and provides identification information of one or more channels associated with the user contract number to the recording apparatus 402.

Figure 19:
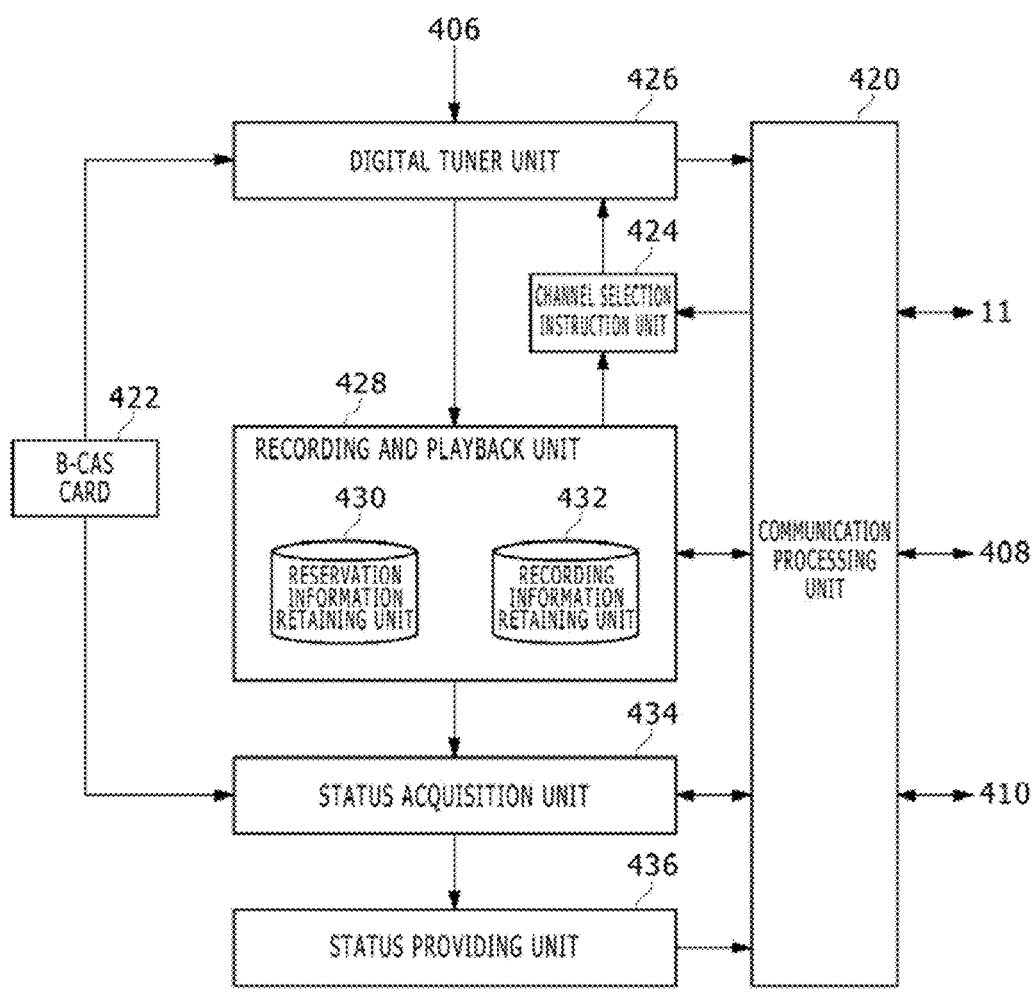
FIG. 19 is a block diagram depicting a functional configuration of a recording apparatus of FIG. 18.

FIG. 19 is a block diagram depicting a functional configuration of the recording apparatus 402 of FIG. 18. The recording apparatus 402 includes a communication processing unit 420, a B-CAS card 422, a channel selection instruction unit 424, a digital tuner unit 426, a recording and playback unit 428, a status acquisition unit 434, and a status providing unit 436.

The communication processing unit 420 transmits and receives data to and from the information processing apparatus 11, DLNA-compatible apparatus 408, and program distribution side apparatus 410 through the LAN 404. Particularly with the information processing apparatus 11 and the DLNA-compatible apparatus 408, the communication processing unit 420 communicates by the HTTP in compliance with the DLNA standard. Further, the communication processing unit 420 further includes an encryption unit not shown. The encryption unit encrypts channel selection data or EPG data outputted from the digital tuner unit 426 hereinafter described or playback data outputted from the recording and playback unit 428 in accordance with the DTCP-IP (Digital Transmission Control Protection over Internet Protocol). The communication processing unit 420 transmits the encrypted data to the information processing apparatus 11 and the DLNA-compatible apparatus 408 in accordance with the HTTP.

The recording apparatus 402 behaves as a DLNA server and permits and sets communication sessions with DLNA clients while the number of communication sessions is limited to a number determined in advance as an upper limit. For example, as regards a communication session for viewing a live video of a broadcasting program, or in other words, as regards a communication session for distributing data of a video, an audio or the like being broadcasted through each channel at present by stream distribution, only one session is permitted at the same time. Accordingly, a DLNA client who can acquire a live video of a broadcasting program using the recording apparatus 402a is, at a certain point of time, one of the information processing apparatus 11 and the DLNA-compatible apparatus 408. On the other hand, as regards a session for viewing a played back video of a recorded program, namely, as regards a session for distributing a video, an audio or the like of a played back recorded content by stream distribution, up to two sessions are permitted at the same time.

The B-CAS card 422 is an IC card in which a user contract number (ID number) and a decryption key for decrypting data encrypted by the MULTI2 which is an encryption form of a digital broadcast are recorded in an IC chip. The channel selection instruction unit 424 accepts a channel selection instruction indicative of identification information (for example, a service ID) of a channel selected by the user from the information processing apparatus 11 through the communication processing unit 420 and transfers the channel selection instruction to the digital tuner unit 426. Further, the channel selection instruction unit 424 accepts a channel selection instruction indicative of identification information (for example, a service ID) of a channel of a recording target program from the recording and playback unit 428 and transfers the channel selection instruction to the digital tuner unit 426.

The digital tuner unit 426 receives terrestrial digital broadcasting, BS broadcasting, and CS broadcasting and acquires various data (for example, a video, an audio, a subtitle and so forth, hereinafter referred to also as "selected channel data") of a channel designated by a channel selection instruction from the channel selection instruction unit 424 from within the broadcasting signal. Further, the digital tuner unit 426 acquires the EPG data superimposed on the broadcasting signal. The digital tuner unit 426 provides selected channel data and EPG data to the information processing apparatus 11 and the DLNA-compatible apparatus 408 through the communication processing unit 420. Further, the digital tuner unit 426 transfers the selected channel data to the recording and playback unit 428 so as to be recorded.

The configuration of the digital tuner unit 426 is described in detail. The digital tuner unit 426 includes a demodulation unit, a decoding unit, a DMX (DeMultiplexer) unit, and a Mux (Multiplexer) unit not depicted. The demodulation unit demodulates an analog signal received by the antenna 406 into a digital signal and passes the digital signal to the decoding unit. The decoding unit uses the decryption key retained in the B-CAS card 422 to decode the broadcasting signal encrypted by the MULTI2.

The DMX unit extracts data of the channel designated by the channel selection instruction unit 424 from within a Full-TS stream of the broadcasting signal decoded by the decoding unit. Then, the DMX unit demultiplexes the extracted data into video data (Video), audio data (Audio), additional data such as a subtitle, and EPG data.

The MUX unit multiplexes the video data, audio data, and additional data from within the data demultiplexed by the DMX unit again to generate a TS packet (also called "Partial-TS"). The MUX unit thereby generates a Partial-TS, which does not include data other than data of the channel of the viewing target or the recording target, from the Full-TS stream. The Partial-TS is hereinafter referred to also as selected channel data. It is to be noted that the MUX unit may otherwise multiplex the video data, audio data, and additional data in a mode in which they are broadcasted or may encode the data again and suitably change a bit rate, picture frame, audio channel number, codec and so forth.

It is to be noted that also the configuration of the signal processing unit 206 of the dedicated tuner 400 is similar to that of the digital tuner unit 426. Meanwhile, the EPG data acquired by the digital tuner unit 426 is EPG data of a channel receivable by the digital tuner unit 426. In the present embodiment, the EPG data acquired by the dedicated tuner 400 is program information of channels of terrestrial digital broadcasting; the EPG data acquired by the recording apparatus 402a is program information of channels of terrestrial digital broadcasting, BS broadcasting, and CS broadcasting; and the EPG data acquired by the recording apparatus 402b is program information of channels of terrestrial digital broadcasting and CS broadcasting. Further, the EPG data acquired by each tuner includes also program information of channels which cannot be viewed by the user because the user does not have a contract (typically, pay broadcasting channels for which the user does not have a contract).

The recording and playback unit 428 includes a reservation information retaining unit 430 and a recording information retaining unit 432. The reservation information retaining unit 430 retains recording reservation information set by the information processing apparatus 11 or the DLNA-compatible apparatus 408. This recording reservation information includes information designating, for example, a recording target channel, a recording target program, recording date and time (namely, program broadcasting date and time), a recording mode and so forth. The recording information retaining unit 432 retains data of recording contents including videos and audios of recorded programs. The recording information retaining unit 432 corresponds to the recording information retaining unit 52 of the information processing apparatus 11 and retains, for example, the recording information illustrated in FIG. 8.

The recording and playback unit 428 accepts recording reservation information transmitted from the information processing apparatus 11 or the DLNA-compatible apparatus 408 through the communication processing unit 420 and stores the recording reservation information into the reservation information retaining unit 430. The recording and playback unit 428 refers to the recording reservation information retained in the reservation information retaining unit 430, and if it detects that the start time of a recording reserved program (namely, recording start time) is reached, then it notifies the digital tuner unit 426 of a channel selection instruction which indicates a channel of the recording reservation target through the channel selection instruction unit 424. Then, the recording and playback unit 428 encrypts the selected channel data outputted from the digital tuner unit 426 by the AES and stores the encrypted selected channel data into the recording information retaining unit 432.

Further, the recording and playback unit 428 accepts a playback instruction transmitted from the information processing apparatus 11 or the DLNA-compatible apparatus 408 through the communication processing unit 420. Then, the recording and playback unit 428 decodes the data of the recording content designated by the playback instruction by the AES and passes the decoded data as playback data to the communication processing unit 420. The communication processing unit 420 encrypts the playback data in accordance with the DTCP-IP and transmits the encrypted playback data to the information processing apparatus 11 or the DLNA-compatible apparatus 408 which is a requesting source of the playback instruction. Also a recording apparatus built in the information processing apparatus 11 (for example, the recording processing unit 64 or the recording information retaining unit 52) is similar to that of the recording and playback unit 428.

The status acquisition unit 434 accepts an acquisition request for status information of the recording apparatus 402 from the information processing apparatus 11 and collects status information relating to a behavior situation or a use situation of the recording apparatus 402 at present, viewing of a broadcasting program and limitation to recording. The status providing unit 436 provides the status information collected by the status acquisition unit 434 to the information processing apparatus 11.

In particular, the status acquisition unit 434 acquires information representative of a table of channels through which a broadcasting signal can be received from the digital tuner unit 426. Further, the status acquisition unit 434 acquires a user contract number from the B-CAS card 422. Then, the status acquisition unit 434 uses the user contract number as a key to issue an inquiry to the program distribution side apparatus 410 about channels included in the contract with the user, or in other words, channels which can be viewed by the user, or further in other words, channels whose decoding by the digital tuner unit 426 is permitted. Then, the status acquisition unit 434 acquires information representative of a table of channels included in the contract with the user from the program distribution side apparatus 410. It is to be noted that it is a matter of course that, if information indicative of a table of channels included in the contract with the user is retained in the recording apparatus 402 (for example, in the digital tuner unit 426 or the like) in advance, then also the retained information may be acquired.

Further, the status acquisition unit 434 refers to the recording reservation information of the reservation information retaining unit 430 to specify a time zone for which a recording reservation is set already, a channel of a recording reservation target, and a storage size required for recording. This storage size may be calculated by the recording and playback unit 428 in response to recording time or a recording mode (picture quality setting or the like) or may otherwise be calculated by the status acquisition unit 434 itself. Further, the status acquisition unit 434 refers to the recording information retaining unit 432 to acquire a free space of the storage which can be used for program recording. Further, the status acquisition unit 434 acquires a number of sessions at present with the DLNA client and types of the sessions (viewing of broadcasting programs or playback viewing of recorded contents) from the communication processing unit 420.

The status providing unit 436 provides the status information of the recording apparatus 402 acquired by the status acquisition unit 434 to the information processing apparatus 11. This status information includes information of a table of channels which can be received by the recording apparatus 402, a table of channels included in the contract with the user, time zones set already for recording reservations, recording target channels and required storage sizes in the recording reservations, the free space of the storage, and the session number at present and the types of the sessions. It is to be noted that, although, in the present embodiment, the information described above is provided as a single piece of status information, it is a matter of course that an individual information acquisition request may be accepted for each information type to provide the individual status information. It is to be noted that, though not depicted in FIG. 2, also the dedicated tuner 400 may have functions corresponding to the status acquisition unit 434 and the status providing unit 436.

Figure 20:
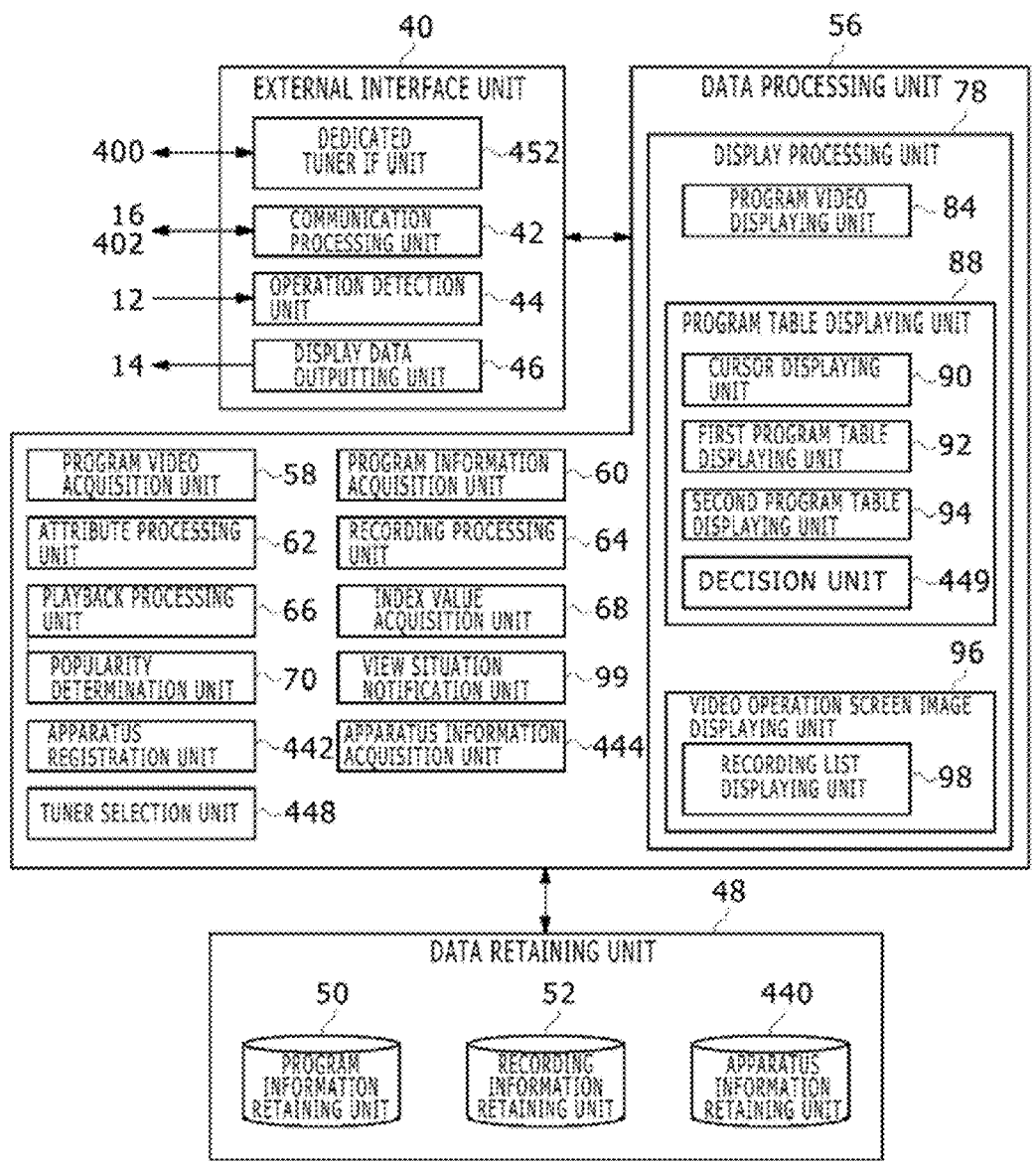
FIG. 20 is a block diagram depicting a functional configuration of an information processing apparatus of FIG. 18.

FIG. 20 is a block diagram depicting a functional configuration of the information processing apparatus 11 of FIG. 18. The data retaining unit 48 of the information processing apparatus 11 of the present embodiment further includes an apparatus information retaining unit 440. The data processing unit 56 of the information processing apparatus 11 further includes an apparatus registration unit 442, an apparatus information acquisition unit 444, and a tuner selection unit 448. Meanwhile, the program table displaying unit 88 further includes a decision unit 449.

A dedicated tuner IF unit 452 corresponds to the tuner IF unit 41 described in the description of the base technology and is an interface for directly connecting to the dedicated tuner 400 by the USB. Further, the communication processing unit 42 functions as an interface with the recording apparatus 402 and particularly carries out HTTP communication with the recording apparatus 402 through the LAN 404.

The program information acquisition unit 60 acquires program information of those channels of terrestrial digital broadcasting which can be received by the dedicated tuner 400 from the dedicated tuner 400 and stores the program information into the program information retaining unit 50. Further, the program information acquisition unit 60 acquires program information of those channels of terrestrial digital broadcasting, BS broadcasting, and CS broadcasting which can be received by the recording apparatus 402a from the recording apparatus 402a and stores the program information into the program information retaining unit 50. Furthermore, the program information acquisition unit 60 acquires program information of those channels of terrestrial digital broadcasting and CS broadcasting which can be received by the recording apparatus 402b from the recording apparatus 402b and stores the program information into the program information retaining unit 50.

The program information acquisition unit 60 integrates program information acquired from the dedicated tuner 400, recording apparatus 402a, and recording apparatus 402b. In particular, when program information of a certain channel is acquired, if program information of the channel (for example, program information which has a coincident service ID) is stored already in the program information retaining unit 50, then the existing program information is overwritten and updated with the newly acquired program information. Meanwhile, when program information of a certain channel is acquired, if program information of the channel is not stored in the program information retaining unit 50 as yet, then the program information of the channel is stored as it is. Consequently, the program information retaining unit 50 retains program information of those channels, which can be received at least one of the dedicated tuner 400, recording apparatus 402a, and recording apparatus 402b, in a concentrated manner.

The apparatus information retaining unit 440 retains information (hereinafter referred to also as "apparatus information") of various apparatus relating to viewing or recording of a broadcasting program by the user. The apparatus information includes status information provided from the recording apparatus 402. Further, the apparatus information can be said as information representative of a limitation to viewing or recording of a broadcasting program by the user as depicted in FIG. 21 or can be said as information representative of a limitation to channels which can be viewed by the user.

FIG. 21 illustrates apparatus information retained by the apparatus information retaining unit 440. In an apparatus ID column, identification information of an apparatus is stored. In FIG. 21, a tuner function for exclusive use for the information processing apparatus 11 (for example, the dedicated tuner 400) is represented as "local." Meanwhile, regarding the recording apparatus 402a and the recording apparatus 402b which provide a tuner function and a recording function not only to the information processing apparatus 11 but also to a DLNA client, individual apparatus information is retained.

In a receivable channel column, information representative of a table of channels which can be received by the individual apparatus is stored. For example, the information may be a table of service IDs which are identification information of the channels which can be received by the individual apparatus. It is assumed that, in the present embodiment, the local (dedicated tuner 400) receives only channels of the terrestrial digital broadcasting; the recording apparatus 402a receives channels of any of the terrestrial digital broadcasting, BS broadcasting, and CS broadcasting; and the recording apparatus 402b receives channels of the terrestrial digital broadcasting and CS broadcasting.

In a viewable channel column, information representative of a table of channels included in the contract for viewing with the user by the user contract numbers which the B-CAS cards of the individual apparatus retain is stored. For example, the information may be a table of channels included in the contract for the individual apparatus, in other words, a table of service IDs which are identification information of channels which can be viewed using the individual apparatus. It is to be noted that, in FIG. 21, also the number of viewable channels for the individual broadcasting types which can be received by the individual apparatus is indicated.

Referring back to FIG. 20, if the operation detection unit 44 detects a connection apparatus updating operation by the user, then the apparatus registration unit 442 uses an SSDP (Simple Service Discovery Protocol) prescribed by the DLNA to detect a connection situation to the recording apparatus 402. If it is detected that a connection state to the recording apparatus 402 is established, then the apparatus registration unit 442 causes the apparatus information acquisition unit 444 to acquire status information of the recording apparatus 402 and records the apparatus information including the status information into the apparatus information retaining unit 440. It is to be noted that the apparatus information of the local (dedicated tuner 400) is registered in the apparatus information retaining unit 440 in advance.

The apparatus information acquisition unit 444 transmits an acquisition request for status information to the recording apparatus 402 when a new recording apparatus 402 is detected by the apparatus registration unit 442 or in response to an instruction from the tuner selection unit 448 hereinafter described. Then, the apparatus information acquisition unit 444 acquires status information transmitted as a response from the recording apparatus 402. In particular, the apparatus information acquisition unit 444 acquires status information including a contract situation of the user with regard to pay channels as limitation information representative of a limitation to channels which can be viewed by the user from each of the dedicated tuner 400 and the general purpose tuner (recording apparatus 402).

If the operation detection unit 44 detects a user operation which designates a viewing target program from among programs being broadcasted at present, then the tuner selection unit 448 determines a priority of the tuners connected to the information processing apparatus (namely, the dedicated tuner 400, recording apparatus 402a, and recording apparatus 402b). This user operation may be an operation indicating viewing of a particular program displayed in the first program table or the second program table. The tuner selection unit 448 determines the tuner which has the highest priority among the plural tuners as a use tuner to be used in viewing of the viewing target program.

The tuner selection unit 448 causes the apparatus information acquisition unit 444 to acquire the latest status information of each tuner and refers to the status information and the apparatus information stored in the apparatus information retaining unit 440 to determine a priority of each tuner. In the present embodiment, the tuner selection unit 448 sets the priority of a tuner, by which a viewing target program can be viewed and for which there is a contract where the viewing target program is broadcasted in a pay channel, to a high value. Further, where the viewing target program can be viewed by a plurality of tuners, a higher priority is set to that one of the tuners which has a smaller number of channels which can be viewed, for example, a smaller number of contracts for pay channels.

The program video acquisition unit 58 transmits a channel selection instruction indicative of a channel selected by the user to the use tuner determined by the tuner selection unit 448 (namely, one of the dedicated tuner 400, recording apparatus 402a, and recording apparatus 402b). For example, if the use tuner is the recording apparatus 402a, then the program video acquisition unit 58 transmits an HTTP request indicative of the channel selection instruction to the recording apparatus 402a through the communication processing unit 42.

The recording apparatus 402a accepting the channel selection instruction AES encrypts the selected channel data including a video and an audio of the channel designated by the user and stream distributes the resulting selected channel data to the information processing apparatus 11. When the program video acquisition unit 58 acquires the selected channel data from the use tuner, it AES decodes the data. The program video displaying unit 84 passes the data of the program and audio of the channel which are a result of the decoding to the display unit 14 so as to be outputted.

If the operation detection unit 44 detects a user operation for requesting displaying of the first program table or the second program table, then the decision unit 449 decides whether each of a plurality of channels to be displayed on the program table is a viewing-limited channel or a viewing-unlimited channel. In particular, the decision unit 449 specifies a plurality of channels whose program information is retained in the program information retaining unit 50, and decides whether or not each of the plural channels is recorded in the viewable channel column in the apparatus information of the apparatus information retaining unit 440. It is a matter of course that it may be decided whether or not a service ID included in the program information is recorded in the viewable channel column.

The decision unit 449 decides that a channel which can be viewed by at least one tuner is a viewing-unlimited channel and that a channel which cannot be viewed by any of the plural tuners is a viewing-limited channel. Typically, the decision unit 449 decides that a free broadcasting channel and a pay broadcasting channel for which the user already has a contract are viewing-unlimited channels, but decides that a pay broadcasting channel for which the user does not have a contract as yet is a viewing-limited channel.

If the operation detection unit 44 detects a user operation indicating displaying of the second program table, then the second program table displaying unit 94 acquires the program information retained in the program information retaining unit 50 and causes the display unit 14 to display the second program table. The second program table displaying unit 94 concentrates program information of a plurality of channels over terrestrial digital broadcasting, BS broadcasting, and CS broadcasting in the single second program table such that the program information of the channels are displayed in a juxtaposed relationship in order of the terrestrial digital broadcasting, BS broadcasting, and CS broadcasting.

FIG. 22 schematically depicts the second program table. Since a terrestrial digital broadcasting 8ch (channel 8) in FIG. 22 can be viewed through all of the dedicated tuner 400, recording apparatus 402a, and recording apparatus 402b, it is decided that the terrestrial digital broadcasting 8ch is a viewing-unlimited channel. Further, since a BS 193ch can be viewed by the recording apparatus 402a, it is decided that the BS 193ch is a viewing-unlimited channel. Furthermore, since a CS 321ch can be viewed by the recording apparatus 402a and the recording apparatus 402b, it is decided that the CS 321ch is a viewing-unlimited channel.

On the other hand, since a CS 331ch and a CS 335ch are not included in any of viewable channels of the dedicated tuner 400, recording apparatus 402a, and recording apparatus 402b (namely, the user has no contract for any tuner as yet), it is decided that the CS 331ch and the CS 335ch are viewing-limited channels. It is to be noted, however, that the CS 335ch includes, among broadcasting programs thereof, some free programs (for example, a program for try viewing) for which no viewing contract is required in advance.

As depicted in FIG. 22, program information of a plurality of channels over terrestrial digital broadcasting, BS broadcasting, and CS broadcasting are integrated into and displayed as a single second program table. The user can move the cursor 132 in the same second program table and view (browse) program information of a plurality of plural channels over terrestrial digital broadcasting, BS broadcasting, and CS broadcasting to select a desired channel without being conscious of the broadcasting type of each channel.

Further, the second program table displaying unit 94 displays the program information of each channel decided as a viewing-limited channel by the decision unit 449 and the program information of each channel decided as the viewing-unlimited channel by the decision unit 449 in different modes from each other. For example, the program information of the terrestrial broadcasting channel 8ch, BS 193ch, and CS 321ch in FIG. 22 is displayed in black characters which are a normal displaying mode. On the other hand, the program information of the CS 331ch and the CS 335ch is displayed in gray characters. In FIG. 22, a region in which the character color of the program information is set to gray is indicated by hatching lines.

Further, the second program table displaying unit 94 refers to the program information of the viewing-limited channels to search for a free program including predetermined information (for example, a keyword such as "free") indicating a free program from among a plurality of programs broadcasted in the viewing-limited channels. Then, even if a free program is of a viewing-limited channel, the program information of the free program is displayed in black characters which are a display mode same as that of the program information of the viewing-unlimited channel. It is to be noted that the program information of programs other than free programs (namely, of pay programs) in viewing-limited channels is displayed in gray characters. FIG. 22 indicates that two free programs are displayed in the normal mode from within the program information of the CS 335ch.

Referring back to FIG. 20, if the operation detection unit 44 detects a user operation indicating displaying the first program table, then the first program table displaying unit 92 acquires the program information retained in the program information retaining unit 50 and causes the display unit 14 to display the first program table. Similarly to the second program table displaying unit 94, the first program table displaying unit 92 concentrates the program information of a plurality of channels over terrestrial digital broadcasting, BS broadcasting, and CS broadcasting in the single first program table such that the program information of the channels is displayed in a juxtaposed relationship in order of the terrestrial digital broadcasting, BS broadcasting, and CS broadcasting.

FIG. 23 schematically depicts the first program table. The first program table displaying unit 92 displays the first program table 116 at part of the video displaying screen 110 on which a program video being broadcasted is displayed. The first program table displaying unit 92 disposes a plurality of program frames 118, which are regions for displaying the program information of channels therein, in the first program table 116, and sets program information individually in the program frames 118.

The first program table displaying unit 92 displays, in the first program table 116, the program information of 20 to 30 channels at the same time on the display unit 14. Accordingly, a width of one program frame 118 is limited to a small width. For example, in FIG. 23, the width of the program frame 118 is limited to such a width that one character string can be displayed in one program frame 118. Therefore, in the first program table 116, characters of the program information are disposed in a juxtaposed relationship in a perpendicular direction to a direction of the arrangement of the channels, in other words, to a channel axis direction in each program frame 118. For example, in FIG. 23, characters configuring a title of a program are juxtaposed in a vertical direction.

In the present embodiment, as a mode in which characters are juxtaposed in the vertical direction, a character string obtained by rotating a character string of horizontal writing indicative of a program title in a clockwise direction by 90 degrees is disposed as in FIG. 23 (as a modification, a character string may be rotated in a counterclockwise direction). As a modification, the characters ("A," "B," "C" and so forth) configuring a program title may be disposed successively in the vertical direction without rotating the characters, and the character string may be displayed in a mode of so called vertical writing. It is to be noted that, similarly to the second program table displaying unit 94, the first program table displaying unit 92 causes the program information of a viewing-unlimited channel and the program information of a viewing-limited channel to be displayed in different modes from each other, and sets the color of the characters of the former program information to black and sets the color of the characters of the latter program information to gray.

The user can move the cursor 132 in the same first program table and view (browse) the program information of a plurality of channels over terrestrial digital broadcasting, BS broadcasting, and CS broadcasting to select a desired channel without being conscious of the broadcasting type of each channel. As described in the description of the base technology, the user can adjust the position of the cursor 132 to a specific program frame 118 to carry out an operation to establish a finally selected state such that a program indicated in the program frame 118 selected by the cursor 132 is displayed on the video displaying screen 110.

Similarly to the advance degree indicator 126 described in the description of the base technology, the first program table displaying unit 92 causes an advance degree indicator 460 indicative of a degree of advance of a program to be displayed in each program frame 118. In the present embodiment, the advance degree indicator 460 has a color different from a background color of the program frame 118 and is displayed as a region painted over by a translucent color. The first program table displaying unit 92 periodically updates a displaying region for the advance degree indicator 460, and reduces the displaying region for the advance degree indicator 460 by an increasing amount as the program advances, or in other words, as the end time of the program comes near, so that the degree of advance of the program is suggested to the user.

The first program table displaying unit 92 causes a scroll frame 462 to be displayed at a lower portion of the first program table 116. The first program table displaying unit 92 divides an inside of the scroll frame 462 into a terrestrial digital broadcasting region 464, a BS broadcasting region 466, and a CS broadcasting region 468 in response to a ratio among the numbers of channels which can be received by terrestrial digital broadcasting, BS broadcasting, and CS broadcasting, and causes the divisional regions to be displayed in different modes from each other. In FIG. 23, the terrestrial digital broadcasting region 464, BS broadcasting region 466, and CS broadcasting region 468 are indicated by hatching lines of different modes from each other. However, it is a matter of course that the regions 464, 466 and 468 may be painted is colors different from each other.

The first program table displaying unit 92 associates channels to be displayed in the first program table 116 and positions in the scroll frame 462 with each other in advance. If a plurality of channels of BS broadcasting are taken as an example, then the channels are associated with the positions from the left to the right in the BS broadcasting region 466 in an order in which the positions are disposed from the left in the first program table 116. In other words, a channel disposed relatively on the left side in the first program table 116 is associated with a relatively left side position in the BS broadcasting region 466, and a channel disposed relatively on the right side in the first program table 116 is associated with a relatively right side position in the BS broadcasting region 466.

The first program table displaying unit 92 causes a scroll bar 470 for scrolling in a direction in which the channels are juxtaposed in the first program table 116 to be displayed in the scroll frame 462 in a predetermined transparency. In particular, the scroll bar 470 is displayed translucently so that the user can easily view at which one of the terrestrial digital broadcasting region 464, BS broadcasting region 466, and CS broadcasting region 468 the scroll bar 470 in the scroll frame 462 is positioned.

The first program table displaying unit 92 causes the scroll bar 470 to be displayed at the position of the scroll frame 462 corresponding to a channel displayed in the first program table 116. For example, the scroll bar 470 is displayed such that the position in the scroll frame 462 corresponding to a channel displayed at a center of the first program table 116 comes to a center of the scroll bar 470. The first program table displaying unit 92 changes over the displaying target channel in the first program table 116 in response to a moving operation of the cursor 132 in the first program table 116. Then, the scroll bar 470 is scrolled to a position in the scroll frame 462 corresponding to the displaying target channel after the changeover.

A behavior of the information processing apparatus 11 having the configuration described above is described below.

Figure 24:
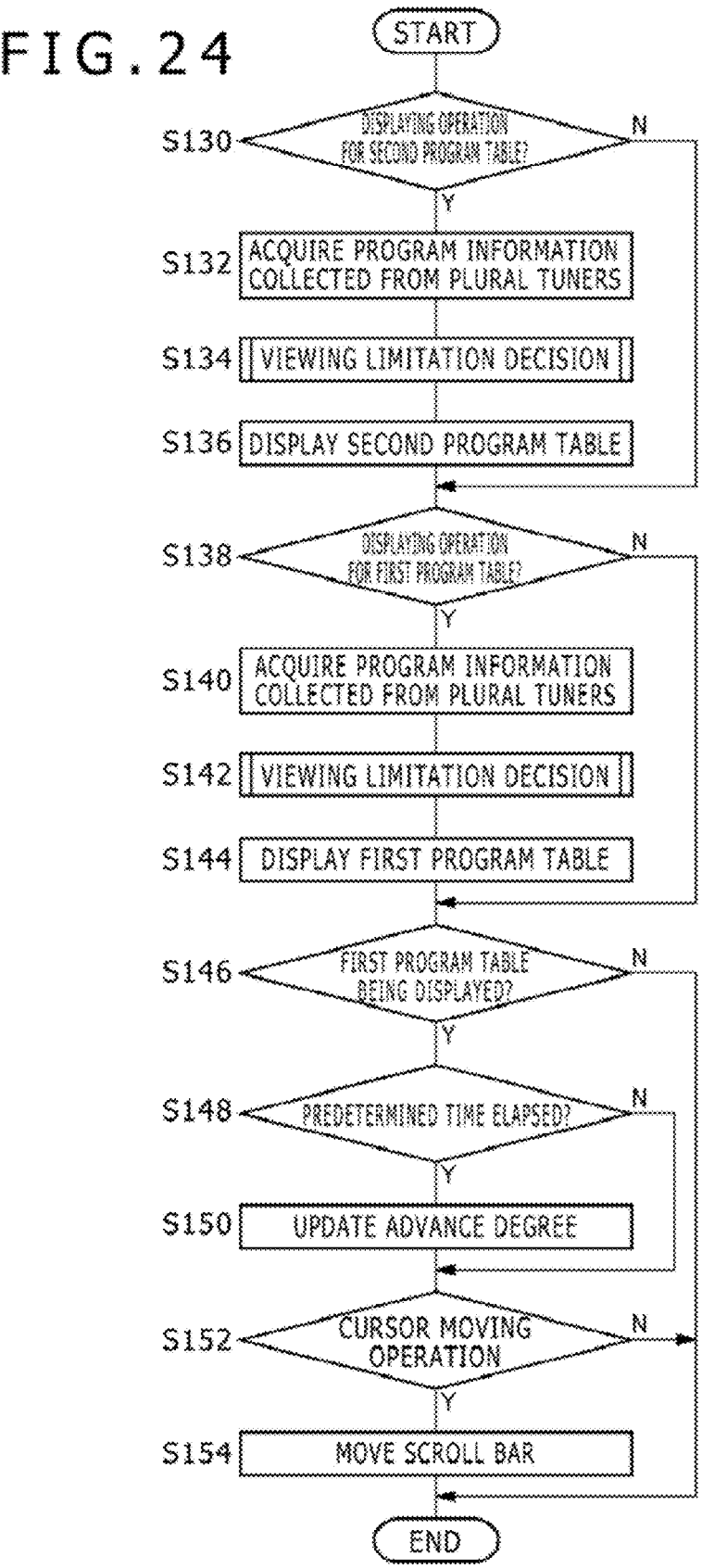
FIG. 24 is a flow chart illustrating a behavior of the information processing apparatus.

FIG. 24 is a flow chart illustrating a behavior of the information processing apparatus 11. If the operation detection unit 44 detects a user operation indicating displaying the second program table (Y at S130), then the program table displaying unit 88 acquires program information collected from a plurality of tuners by the program information acquisition unit 60 from the program information retaining unit 50 (S132). The program table displaying unit 88 executes a viewing limitation decision for a plurality of channels to be displayed in the program table (S134), and causes the second program table to be displayed in a mode suitable for a result of the decision (S136).

At S136, the program table displaying unit 88 concentrates and displays the program information of the plural channels over a plurality of broadcasting types in the same second program table. Further, in the second program table, a character string indicative of the program information of a viewing-unlimited channel is displayed in black while a character string indicative of the program information of a viewing-limited channel is displayed in gray. However, of a free program included in a viewing-limited channel, the character color of the program information is displayed in black. If a user operation indicating displaying the second program table is not detected as yet (N at S130), then the steps S132 to S136 are skipped.

If the operation detection unit 44 detects a user operation indicating displaying the first program table (Y at S138), then the program table displaying unit 88 acquires the program information collected from a plurality of tuners by the program information acquisition unit 60 from the program information retaining unit 50 (S140). The program table displaying unit 88 executes a viewing limitation decision for a plurality of channels to be displayed on the program table (S142), and displays the first program table in a form suitable for a result of the decision (S144). In the present embodiment, as depicted in FIG. 23, the first program table is displayed in a superposed relationship with the video displaying screen 110 on which a broadcasting program is being displayed.

At S144, the program table displaying unit 88 concentrates and displays program information of programs, which are being broadcasted at present, of channels over a plurality of broadcasting types in the same first program table. Further, in the first program table, the character string of the program information of each viewing-unlimited channel is disposed in a juxtaposed relationship in one vertical column, and the character color of the program information is set to black. On the other hand, while the character string of the program information of each viewing-unlimited channel is disposed in a juxtaposed relationship in one vertical column similarly to the program information of the viewing-unlimited channel, the character color is set to gray. However, if a free program is being broadcasted in a viewing-unlimited channel, then the character color for the free program is set to black. If a user operation indicating displaying the first program table is not detected as yet (N at S138), then the steps S140 to S144 are skipped.

If waiting time predetermined in advance elapses (Y at S148) while the first program table is being displayed (Y at S146), then the program table displaying unit 88 updates the displaying of the advance degree indicator 460 for the programs in the first program table (S150). If the waiting time does not elapse (N at S148), then the step S150 is skipped. If the operation detection unit 44 detects a moving operation for the cursor 132 (Y at S152), then the program table displaying unit 88 moves the cursor 132 in the first program table to successively change over the channels of the displaying target. Together with this, the program table displaying unit 88 scrolls the scroll bar 470 in the scroll frame 462 to present the broadcasting type of the channel being currently displayed to the user (S154). If a moving operation for the cursor 132 is not detected (N at S152), then the step S154 is skipped, and if the first program table is not being displayed (N at S146), then the step S148 and succeeding steps are skipped.

Figure 25:
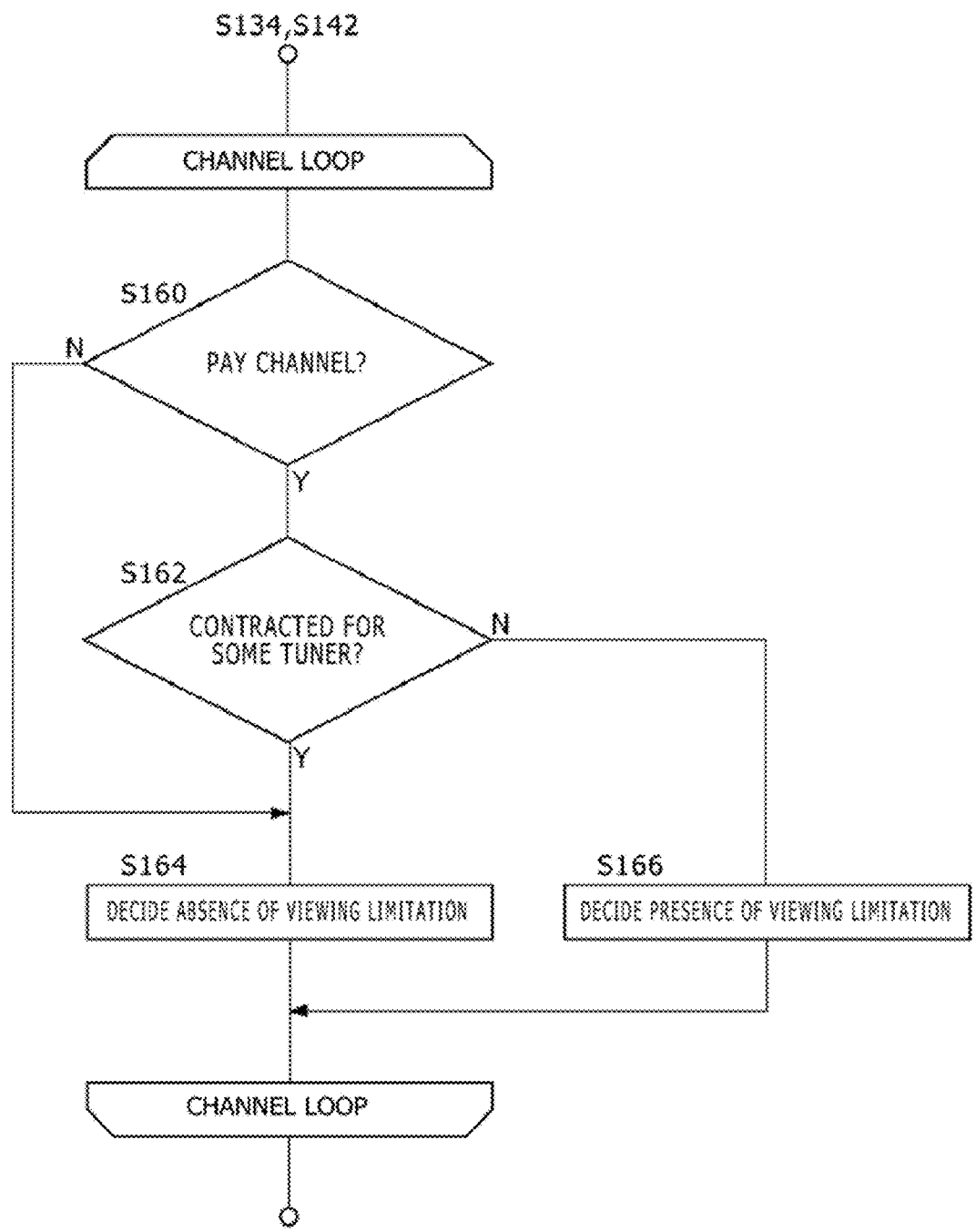
FIG. 25 is a flow chart illustrating S134 and S142 of FIG. 24 in detail.

FIG. 25 is a flow chart illustrating the viewing limitation decision process at S134 and S142 of FIG. 24 in detail. In the viewing limitation decision process, processes at S160 to S166 hereinafter described are repetitively performed, as a channel loop, for each channel whose program information is to be displayed in a program table such that it is decided which one of a viewing-unlimited channel and a viewing-limited channel the channel is.

In particular, the program table displaying unit 88 decides whether or not a decision target channel is a pay channel for which a contract in advance by the user is required in accordance with channel attribute information set in program information or channel attribute information retained in advance. If the decision target channel is not a pay channel (N at S160), then it is decided that the decision target channel is a viewing-unlimited channel (S164). Also where the decision target channel is a pay channel (Y at S160) and is a channel contracted already for some tuner (Y at S162), it is decided that the decision target channel is a viewing-unlimited channel (S164). On the other hand, if the decision target channel is a pay channel (Y at S160) and is a channel not contracted for any channel as yet (N at S162), then it is decided that the decision target channel is a viewing-unlimited channel (S166).

With the information processing apparatus 11 of the present embodiment, program information of a viewing-limited channel and program information of a viewing-unlimited channel are displayed in different modes from each other in a program table so that the user can easily decide whether the displayed program is a program capable of being viewed or a program not capable of being viewed. Consequently, a situation in which it is recognized that a program cannot be viewed only after an operation for viewing the program is carried out by the user can be suppressed, and the convenience to the user can be enhanced. Particularly, in a situation in which multi-channeling progresses, although it is difficult for the user itself to grasp viewability of each of a great number of channels, by reflecting viewability of each channel on a program table, a channel selection operation of the user can be supported.

It is to be noted that the first program table and the second program table in the present embodiment are displayed in different modes in accordance with a viewing contract situation of the user specified based on the ID number retained in the B-CAS card of the user. For example, a result of the viewing limitation decision is different for each program viewing system 10 of each user in FIG. 18, and as a result, the first program table and the second program table are suitably displayed in different modes among the program viewing systems 10 of the users.

Further, with the information processing apparatus 11, it is decided that a channel capable of being viewed through at least one of the plural tuners selectively used upon program viewing is a viewing-unlimited channel. Consequently, a program table conforming to viewability of channels based on a combination of a plurality of tuners among which there is the possibility that channels capable of being viewed may be different can be displayed. Particularly, in a situation in which the information processing apparatus 11 is connected to a great number of tuners through a communication network, although it is difficult for the user itself to grasp individual channels capable of being viewed through each of the tuners, where viewability of channels based on a combination of a plurality of tuners is reflected on a program table, a channel selection operation of the user can be supported.

Further, with the information processing apparatus 11, even if a program is of a viewing-limited channel, if the program is a free program, then information of the program is displayed in a mode same as that of a program of a viewing-unlimited channel. Consequently, the presence of a program capable of being viewed even if the program is of a viewing-limited channel, for example, of a free program to be broadcasted for promotion of joining of viewers in a pay broadcasting channel, is likely to be grasped by the user.

Further, with the information processing apparatus 11, program information of a plurality of channels over a plurality of broadcasting types are displayed in a juxtaposed relationship on a single program table without involving changeover of a screen image. Consequently, it becomes unnecessary for the user to carry out a changeover operation of a program table in response to the broadcasting type of a channel whose program substance is to be confirmed. For example, a selection operation for selecting one of program tables for terrestrial digital broadcasting, BS broadcasting, or CS broadcasting to be displayed becomes unnecessary. Further, the broadcasting substance of channels of terrestrial digital broadcasting, BS broadcasting, and CS broadcasting can be browsed in the same screen image, and, for example, the substance of each program can be confirmed seamlessly by a cursor operation.

Further, with the information processing apparatus 11, EPG data acquired from a plurality of tuners are concentrated and displayed in one program table without involving changeover of a screen image. Consequently, by using the plural tuners, information of channels capable of being viewed actually by the user can be presented to the user using a single user interface, and the convenience to the user can be enhanced.

Furthermore, with the information processing apparatus 11, by disposing characters of program information in a juxtaposed relationship in a perpendicular direction to a juxtaposition direction of channels in the program table, program information of a great number of channels can be displayed on the display unit 14 at the same time. If the displaying region for each channel is increased in a situation in which multi-channeling is progressing, then time is required for grasping of the entire program table. With the displaying mode of the present embodiment, it is facilitated to present program information of channels in the maximum while program information of a great number of channels is displayed at the same time.

The present invention has been described in connection with the embodiment. It is recognized by those skilled in the art that the embodiment is illustrative, and various modifications can be implemented relating to the combination of the components and the processes and also the various modifications fall within the scope of the present invention. Modifications are described below.

Though not mentioned in the description of the embodiment described above, the decision unit 449 may decide otherwise whether the decision target channel is a viewing-unlimited channel or a viewing-limited channel in response to a use situation of the dedicated tuner 400 and the recording apparatus 402 (namely, general purpose tuner). In other words, a current use situation of each tuner may be confirmed such that viewing-unlimited channels are further narrowed down based on the presence or absence of a tuner whose use is limited currently.

In particular, a decision regarding whether or not each tuner is being used for recording and another decision regarding whether or not a different DLNA client is being used (in other words, a limitation to the number of sessions for the DLNA client) as a use situation may be reflected on the viewing limitation decision. Further, a channel capable of being viewed currently may be decided as a viewing-unlimited channel and a different channel (for example, a channel that cannot be viewed currently because the tuner is being used for some other use) may be decided as a viewing-limited channel.

Here, since each of the dedicated tuner 400 and the recording apparatus 402 is a single tuner, where the dedicated tuner 400 and the recording apparatus 402 are being used for recording, the viewable channels are limited to broadcasting channels of the recording target programs. Accordingly, the decision unit confirms whether or not the dedicated tuner 400 and the recording apparatus 402 are being used for recording. For example, with regard to the dedicated tuner 400, it may be confirmed whether or not the time at present is included in a time zone reserved for recording which is included in the recording information of the recording information retaining unit 52. Meanwhile, with regard to the recording apparatus 402, it may be confirmed whether or not the time at present is included in a time zone reserved for recording which is included in the status information.

If the dedicated tuner 400 and the recording apparatus 402 are not being used for recording, then the decision unit 449 executes the viewing limitation decision for a decision target channel in accordance with viewable channels indicated by the apparatus information similarly as in the embodiment. On the other hand, if the dedicated tuner 400 or the recording apparatus 402 is being used for recording, then the decision unit 449 executes the viewing limitation decision for a decision target channel deciding that the viewable channel by the tuner being used for recording only is a broadcasting channel of the recording target program. In other words, the viewing limitation decision is executed after the modulus of viewable channels in the individual tuners is narrowed down.

Further, the decision unit 449 specifies the number of sessions set by the recording apparatus 402 and the type of the sessions in accordance with the status information acquired from the recording apparatus 402, and confirms whether or not the recording apparatus 402 is to permit a viewing session of a broadcasting program to a new DLNA client. If a viewing session with the recording apparatus 402 can be established, then the decision unit 449 executes the viewing limitation decision for a decision target channel in accordance with the viewable channels indicated by the apparatus information similarly as in the embodiment. On the other hand, if a viewing session with the recording apparatus 402 cannot be established, then the decision unit 449 executes the viewing limitation decision for a decision target channel deciding that there is no channel capable of being viewed through the recording apparatus 402.

With the modification just described, it can be decided more strictly which one of a viewing-limited channel and a viewing-unlimited channel each channel is to present a program table on which a use situation of the tuners is reflected. Accordingly, occurrence of a situation that a program indicated as a viewable program in a program table cannot actually be viewed can be suppressed.

As a further modification, the program table displaying unit 88 may change over and display the program table in the embodiment and a program table on which a use situation of a tuner is reflected by a predetermined user operation. The program table in the embodiment presents, as a principle, a program capable of being viewed by the user as a viewing-unlimited channel, and the program table on which a use situation of the tuner is reflected presents a program capable of being viewed actually at present by the user as a viewing-unlimited channel. Therefore, by displaying the two program tables, which depend upon criteria different from each other, in response to selection by the user, the convenience to the user can be enhanced.

Further, in the embodiment described above, the first program table displaying unit 92 and the second program table displaying unit 94 use displaying modes different from each other such that the character color of program information of a viewing-unlimited channel is black and the character color of program information of a viewing-limited channel is gray. As a modification, the displaying region of the program information (except for a free program) of a viewing-limited channel may be gray out. Further, the program information (except for a free program) of a viewing-limited channel may be displayed in lower picture quality than that of the program information of a viewing-unlimited channel. For example, the displaying region of the program information of a viewing-limited channel may be displayed in a gradating mode by a low-pass filter (Gaussian filter or the like).

Further, while, in the embodiment described above, the first program table displaying unit 92 displays the first program table 116 in a superposed relationship at a lower portion of the video displaying screen image 110, it is a matter of course that the first program table 116 may be displayed in a superposed relationship with a left side portion or a right side portion of the video displaying screen image 110. In this case, the juxtaposition direction of channels may be a vertical direction, and a characteristic string of program information may be juxtaposed in a horizontal direction.

Further, though not mentioned in the description of the embodiment described above, it is a matter of course that the second program table displaying unit 94 may display the scroll frame 462 and the scroll bar 470 in the second program table similarly to the first program table displaying unit 92.

Further, as described in the description of the base technology, the second program table displaying unit 94 increases or decreases the width of the displaying region (hereinafter referred to sometimes as "channel frame") for each channel in the second program table in response to an operation by the user. Here, where the width of each channel frame is to be decreased in response to an operation by the user, the second program table displaying unit 94 may display a second program table in which the horizontal axis is multi-channelized to approximately 30 channels similarly to the first program table 116 in the embodiment. When a changeover request to the second program table in which the width of the channel frame is smaller than a predetermined value is accepted from the user, the second program table displaying unit 94 may change over the displaying direction of the program information in each channel frame from a horizontal direction to a vertical direction.

Similarly, the first program table displaying unit 92 may increase or decrease the channel frame (namely, channel frame 118) width in the first program table in response to an operation of the user. For example, when an expansion operation is accepted during display of the first program table 116 of FIG. 23, the first program table displaying unit 92 may cause the first program table 116 to be displayed in a form expanded to the channel frame depicted in FIG. 9. Further, when a reduction operation is accepted during display of the first program table 116 depicted in FIG. 9, the first program table displaying unit 92 may cause the first program table 116 of FIG. 23 to be displayed. When a changeover request to the first program table in which the width of each channel frame is smaller than a predetermined value is accepted from the user, the first program table displaying unit 92 may change over the display thereof from horizontal display till then to vertical display to display the program information in the channel frames. It is to be noted that also it is a matter of course that, also in the first program table 116 of FIG. 9, the first program table displaying unit 92 may display the scroll frame 462 and the scroll bar 470.

Also an arbitrary combination of the base technology, embodiment, and modifications described above is useful as an embodiment of the present invention. A new embodiment created by the combination has effects which the embodiment and the modifications combined with each other individually have.

Also it is recognized by those skilled in the art that the functions which are to be realized by the features described in the claims are implemented by each or cooperation of the components exemplified in the base technology, embodiment, and modifications.

REFERENCE SIGNS LIST

10 Program viewing system, 11 Information processing apparatus, 58 Program video acquisition unit, 60 Program information acquisition unit, 84 Program video displaying unit, 88 Program table displaying unit, 90 Cursor displaying unit, 92 First program table displaying unit, 94 Second program table displaying unit, 100 Information processing system, 440 Apparatus information retaining unit, 442 Apparatus registration unit, 444 Apparatus information acquisition unit, 448 Tuner selection unit, 449 Decision unit, 462 Scroll frame, 470 Scroll bar.

INDUSTRIAL APPLICABILITY

The present invention can be applied to an apparatus which causes a program table to be displayed.

The invention claimed is:

1. An information processing apparatus, comprising:
a program information acquisition unit configured to acquire program information of each of a plurality of channels over a plurality of broadcasting types, among which a transmitting form of a broadcasting signal is different; and
a program table displaying unit configured to cause a program table, in which program information of the plurality of channels is juxtaposed in a classified state for each channel, to be displayed and cause both of program information of channels belonging to a first broadcasting type and program information of channels belonging to a second broadcasting type to be displayed in a juxtaposed relationship in the same program table, wherein
the program table displaying unit causes the program table to be displayed in a region which is part of a screen image which displays programs being broadcasted and is smaller than a region in which the programs being broadcasted are displayed,
the program table displaying unit causes a width of a region for each channel in the program table being displayed to be increased or decreased in response to a predetermined operation input by a user to increase or decrease number of channels whose program information is to be displayed at the same time in the program table being displayed,
the program table displaying unit causes a scroll bar for causing scrolling in a direction in which the channels are juxtaposed in the program table and a scroll frame representative of a movable range of the scroll bar to be displayed and causes the scroll bar to be displayed at a position in the scroll frame which corresponds to channels being displayed in the program table, and the program table displaying unit causes a region of the scroll frame corresponding to channels belonging to the first broadcasting type and a region of the scroll frame corresponding to channels belonging to the second broadcasting type to be displayed in different modes from each other.

2. The information processing apparatus according to claim 1, wherein the program table displaying unit causes characters representative of program information to be disposed in a juxtaposed relationship in a perpendicular direction to a direction in which the channels are juxtaposed in the region for each channel of the program table.

3. The information processing apparatus according to claim 1, wherein
the information processing apparatus is connected to a plurality of tuners between or among which a receivable broadcasting type or types are different,
the program information acquisition unit acquires program information of channels belonging to the receivable broadcasting type or types by each of the plural tuners from the tuner, and
the program table displaying unit causes the program information of the plural channels acquired from the plural tuners to be displayed in a concentrated manner in the same program table.

4. A program table displaying method executed by an information processing apparatus, comprising:
acquiring program information of each of a plurality of channels over a plurality of broadcasting types, among which a transmitting form of a broadcasting signal is different; and
causing a program table, in which program information of the plurality of channels is juxtaposed in a classified state for each channel, to be displayed and causing both of program information of channels belonging to a first broadcasting type and program information of channels belonging to a second broadcasting type to be displayed in a juxtaposed relationship in the same program table, wherein
causing a program table to be displayed causes the program table to be displayed in a region which is part of a screen image which displays programs being broadcasted and is smaller than a region in which the programs being broadcasted are displayed,
causing a program table to be displayed causes a width of a region for each channel in the program table being displayed to be increased or decreased in response to a predetermined operation input by a user to increase or decrease the number of channels whose program information is to be displayed at the same time in the program table being displayed,
causing a program table to be displayed causes a scroll bar for causing scrolling in a direction in which the channels are juxtaposed in the program table and a scroll frame representative of a movable range of the scroll bar to be displayed and causes the bar to be displayed at a position in the scroll frame which corresponds to channels being displayed in the program table, and
causing a program table to be displayed causes a region of the scroll frame corresponding to channels belonging to the first broadcasting type and a region of the scroll frame corresponding to channels belonging to the second broadcasting type to be displayed in different modes from each other.

5. A computer program, embodied in a non transitory computer-readable medium, for an information processing apparatus, comprising:
acquiring program information of each of a plurality of channels over a plurality of broadcasting types, among which a transmitting form of a broadcasting signal is different; and
causing a program table, in which program information of the plurality of channels is juxtaposed in a classified state for each channel, to be displayed and causing both of program information of channels belonging to a first broadcasting type and program information of channels belonging to a second broadcasting type to be displayed in a juxtaposed relationship in the same program table, wherein
causing a program table to be displayed causes the program table to be displayed in a region which is part of a screen image which displays programs being broadcasted and is smaller than a region in which the programs being broadcasted are displayed,
causing a program table to be displayed causes a width of a region for each channel in the program table being displayed to be increased or decreased in response to a predetermined operation input by a user to increase or decrease the number of channels whose program information is to be displayed at the same time in the program table being displayed,
causing a program table to be displayed causes a scroll bar for causing scrolling in a direction in which the channels are juxtaposed in the program table and a scroll frame representative of a movable range of the scroll bar to be displayed and causes the scroll bar to be displayed at a position in the scroll frame which corresponds to channels being displayed in the program table, and
causing a program table to be displayed causes a region of the scroll frame corresponding to channels belonging to the first broadcasting type and a region of the scroll frame corresponding to channels belonging to the second broadcasting type to be displayed in different modes from each other.

* * * * *